United States Patent
Saito et al.

(10) Patent No.: US 8,248,900 B2
(45) Date of Patent: Aug. 21, 2012

(54) OPTICAL DISC APPARATUS, FOCUS POSITION CONTROL METHOD AND RECORDING MEDIUM

(75) Inventors: Kimihiro Saito, Minato-ku (JP); Toshihiro Horigome, Minato-ku (JP); Takao Kondo, Tokyo (JP); Kunihiko Hayashi, Minato-ku (JP); Seiji Kobayashi, Minato-ku (JP); Takashi Iwamura, Minato-ku (JP); Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 12/441,147

(22) PCT Filed: Sep. 13, 2007

(86) PCT No.: PCT/JP2007/068318
§ 371 (c)(1),
(2), (4) Date: Jun. 30, 2009

(87) PCT Pub. No.: WO2008/032865
PCT Pub. Date: Mar. 20, 2008

(65) Prior Publication Data
US 2010/0046338 A1 Feb. 25, 2010

(30) Foreign Application Priority Data
Sep. 14, 2006 (JP) .................................. 2006-249804

(51) Int. Cl.
*G11B 7/00* (2006.01)
(52) U.S. Cl. ..................................... 369/47.15; 369/103
(58) Field of Classification Search .......... None
See application file for complete search history.

(56) References Cited

U.S. PATENT DOCUMENTS
6,272,095 B1   8/2001   Liu et al.
(Continued)

FOREIGN PATENT DOCUMENTS
EP       1 691 356 A2    8/2006
(Continued)

OTHER PUBLICATIONS

Kasami, Yutaka et al., "Large Capacity and High-Data-Rate Phase-Change Disks", Japan Journal Appl. Phys., vol. 39, Part 1, No. 2B, pp. 756-761, 2000.

(Continued)

*Primary Examiner* — Hoa T Nguyen
*Assistant Examiner* — Emily Frank
(74) *Attorney, Agent, or Firm* — Oblon, Spivak, McClelland, Maier & Neustadt, L.L.P.

(57) ABSTRACT

An optical disc apparatus can highly accurately record a hologram representing information on or reproduce such a hologram from an optical disc. When recording information on an optical disc 100, the optical disc apparatus controls the position of an objective lens OL1 according to the outcome of detection of a red reflected light beam Lr2 so as to make the focus Fr thereof follow a target track and it also makes the focus Fb1 of a blue light beam Lb1 agree with a target mark position by the objective lens OL1 and also the focus Fb2 agree with the target mark position by controlling the position of another objective lens OL2 according to the outcome of detection of the blue light beam Lb1 by way of the objective lenses OL1 and OL2 so as to make the focus Fb1 of the blue light beam Lb1 and the focus Fb2 of the blue light beam Lb2 agree with the target mark position and the blue light beam Lb1 and the blue light beam Lb2 interfere with each other. Thus, as a result, the optical disc apparatus can record a recording mark RM at the target mark position.

14 Claims, 9 Drawing Sheets

U.S. PATENT DOCUMENTS

| | | | |
|---|---|---|---|
| 2004/0027968 A1* | 2/2004 | Horimai | 369/103 |
| 2005/0013231 A1* | 1/2005 | Kawano et al. | 369/103 |
| 2005/0270954 A1* | 12/2005 | An et al. | 369/112.01 |
| 2007/0091767 A1* | 4/2007 | Liedenbaum | 369/103 |
| 2007/0285751 A1* | 12/2007 | Kim | 359/10 |
| 2009/0003181 A1* | 1/2009 | Matsuura | 369/103 |
| 2009/0175149 A1* | 7/2009 | Bae et al. | 369/103 |
| 2009/0290202 A1 | 11/2009 | Mizushima et al. | |

FOREIGN PATENT DOCUMENTS

| | | |
|---|---|---|
| EP | 1 691 356 A3 | 8/2006 |
| JP | 2002 63733 | 2/2002 |
| WO | WO 2006/093054 A1 | 9/2006 |

OTHER PUBLICATIONS

Ichimura, Isao et al., "Proposal for Multi-layer Blu-ray Disc Structure", Technical Digest of ISOM'04, pp. 52-53, 2005.

McLeod, Robert R. et al., "Microholographic multilayer optical disk data storage", Applied Optics, vol. 44, No. 16, pp. 3197-3207, 2005.

U.S. Appl. No. 12/272,179, filed Nov. 17, 2008, Saito, et al.

Hideyoshi Horimai, et al., "Collinear Holography", Applied Optics., vol. 44, No. 13., XP007901854, May 1, 2005, pp. 2575-2579.

Japanese Office Action issued Jan. 10, 2012 in patent application No. 2006-249804 with English translation.

* cited by examiner

OPTICAL DISC APPARATUS, FOCUS POSITION CONTROL METHOD AND RECORDING MEDIUM

TECHNICAL FIELD

The present invention relates to an optical disc apparatus, a focus position control method and a recording medium that can suitably be applied, for example, to optical disc apparatus for recording holograms on optical discs.

BACKGROUND ART

Optical disc apparatuses for irradiating a light beam onto an optical disc such as a CD (compact disc), a DVD (digital versatile disc) or a Blu-ray disc (trademark, to be referred to as BD hereinafter) and reproducing information by reading reflected light thereof have been spreading.

Such optical disc apparatus are made to record information by irradiating a light beam onto an optical disc and changing the local reflectance of the optical disc.

As for optical discs, it is known that the size of the light spot formed on the optical disc is defined substantially as λ/NA (λ: the wavelength of the light beam, NA: the numerical aperture) and the resolution is proportional to this value. For example, Non-Patent Document 1 shows details of a BD that can record about 25 GB of data on an optical disc having a diameter of 120 mm.

Meanwhile, optical discs are designed to record various pieces of information such as various kinds of contents including music contents and video contents or various data for computers. Particularly, in recent years, the quantity of information has increased due to the use of high definition images and high sound quality music and, because an increased number of contents is required to be recorded on a single optical disc, there is a demand for larger capacity optical discs.

Thus, techniques for increasing the recording capacity of a single optical disc by laying a recording layer on another have been proposed (refer to, e.g., Non-Patent Document 2).

On the other hand, optical disc apparatus employing holograms have been proposed as techniques for recording information on optical discs (refer to, e.g., Non-Patent Document 3).

For instance, as shown in FIG. 1, an optical disc apparatus 1 is designed to once converge a light beam from an optical head 7 in an optical disc 8 that is made of a photopolymer whose refractive index changes according to the intensity of emitted light and then converges the light beam once again to the same focus position from the opposite direction by means of a reflection device 9 arranged at the rear surface side (the lower side in FIG. 1) of the optical disc 8.

The optical disc apparatus 1 causes a light beam that is a laser beam from a laser 2 to be emitted, modulates the light wave by means of an acousto-optic modulator 3 and converts the light beam into collimated light by a collimator lens 4. Subsequently, the laser beam is transmitted through a polarization beam splitter 5 and converted from linearly polarized light into a circularly polarized light by a quarter wave plate 6 before it is entered into the optical head 7.

The optical head 7 is adapted to record and reproduce information. It reflects the light beam by a mirror 7A, focuses the reflected light beam by objective lens 7B and then emits the light beam onto an optical disc 8 that is driven to rotate by a spindle motor (not shown).

At this time, the light beam is once focused in the inside of the optical disc 8 before it is reflected by the reflection device 9 arranged at the rear surface side of the optical disc 8 and then converged to the same focus in the inside of the optical disc 8 from the rear surface side of the optical disc 8. Note that the reflection device 9 is formed by a condenser lens 9A, a shutter 9B, a condenser lens 9C and reflection mirror 9D.

As a result, as shown in FIG. 2(A), a standing wave is generated at the focus position of the light beam and a recording mark RM that is a small hologram of the size of a light spot having a shape of two cones that are bonded to each other at the bottoms thereof as a whole is formed. Then, the recording mark RM is recorded as information.

When the optical disc apparatus 1 records a plurality of such recording marks RM in the inside of an optical disc 8, it forms a mark recording layer by rotating the optical disc 8 and arranging the recording marks RM along concentric or spiral tracks. Then, the optical disc apparatus 1 can record recording marks RM so as to lay a plurality of mark recording layers one on the other by adjusting the focus position of the light beam.

As a result, the optical disc 8 shows a multilayer structure having a plurality of mark recording layers inside. For example, the optical disc 8 shows a distance (mark pitch) p1 between recording marks RM of 1.5 µm, a distance (track pitch) p2 between tracks of 2 µm and a distance p3 between layers of 22.5 µm as shown in FIG. 2(B).

Additionally, when the optical disc apparatus 1 reproduces information from an optical disc 8 where recording marks RM are recorded, it closes the shutter 9B of the reflection device 9 so that no light beam may be emitted to the optical disc 8 from the rear surface side thereof.

At this time, the optical disc apparatus 1 emits a light beam onto a recording mark RM in the optical disc 8 by the optical head 7 and causes the reproduction light beam generated from the recording mark RM to enter the optical head 7. The reproduction light beam is converted from circularly polarized light into a linearly polarized light by the quarter wave plate 6 and reflected by the polarization beams splitter 5. Additionally, the reproduction light beam is converged by a condenser lens 10 and emitted onto a photodetector 12 by way of a pin hole 11.

At this time, the optical disc apparatus 1 detects the quantity of light of the reproduction light beam by the photodetector 12 and reproduces information according to the results of the detection.

Non-Patent Document 1: Y. Kasami, Y. Kuroda, K. Seo, O. Kawakubo, S. Takagawa, M. Ono and M. Yamada, Jpn. J. Appl. Phys., 39, 756 (2000).
Non-Patent Document 2: I. Ichimura et al., Technical Digest of ISOM'04, pp 52, Oct. 11-15, 2005, Jeju Korea.
Non-Patent Document 3: R. R. McLeod et al., "Microholographic multilayer optical disc data storage," Appl. Oct., Vol. 44, 2005, pp 3197.

Meanwhile, known optical disc apparatuses that correspond to CDs, DVDs or BDs have a possibility of producing surface shaking or eccentricity to the optical disc being driven to rotate but are made to be able to accurately emit a light beam onto the target track by performing various control operations such as focus control and tracking control according to the results of the detection of the light beam.

However, the optical disc apparatus 1 as shown in FIG. 1 is not adapted to be able to specifically perform operations such as focus control and tracking control so that it cannot accommodate surface shaking or eccentricity that can be produced on an optical disc.

In other words, the optical disc apparatus 1 may not be able to accurately focus a light beam to a desired position in an optical disc 8 and correctly record or reproduce information.

DISCLOSURE OF INVENTION

In view of the above identified problems, it is therefore the object of the present invention to propose an optical disc apparatus that can highly accurately record a hologram representing information on or reproduce such a hologram from an optical disc, a focus position control method that can highly accurately control the focus position of light being used for recording or reproducing a hologram and a recording medium that can highly accurately record a hologram representing information.

In an aspect of the present invention, the above object is achieved by providing an optical disc apparatus for irradiating first and second light beams emitted from a same light source so as to be focused to a same focus position from the opposite surfaces of a disk-shaped recording medium respectively by way of corresponding first and second objective lenses and recording a standing wave, including: a first control means for controlling the position of the first objective lens according to the returning light beam from a reflection layer arranged in the recording medium; a detection means for detecting the first or second light beam emitted from either the first objective lens or the second objective lens, transmitted through the recording medium and made incident to the other objective lens; and a second control means for controlling the position of the second objective lens so as to make the focus position of the first objective lens and that of the second objective lens agree with each other according to the outcome of detection by the detection means.

With this arrangement, according to the present invention, the focus position of the first light beam can be made to agree with a desired position by means of the first objective lens whose position is controlled according to the returning light beam from the reflection layer in the recording medium and the focus position of the second light beam can be made to agree with the desired position along with the focus position of the first light beam by controlling the position of the second objective lens according to outcome of detection of the first or second light beam after it is transmitted through the second objective lens.

In another aspect of the present invention, there is provided a focus position control method for emitting first and second light beams so as to be focused to a same focus position from the opposite surfaces of a target of irradiation by way of first and second objective lenses, including: a first control step of controlling the position of the first objective lens according to the returning light beam from a reflection layer arranged in the irradiation target; and a second control step of detecting the first or second light beam emitted from the first or second objective lens, transmitted through the target of irradiation and made incident to the other objective lens and controlling the position of the second objective lens so as to be make the focus positions of the first and second objective lenses agree with each other according to the outcome of detection.

With this arrangement, according to the present invention, the focus position of the first light beam can be made to agree with a desired position by means of the first objective lens that is controlled for position according to the returning light beam from the reflection layer in target of irradiation and the focus position of the second light beam can be made to agree with the desired position along with the focus position of the first light beam by controlling the position of the second objective lens according to outcome of detection of the first or second light beam after it is transmitted through the second objective lens.

In still another aspect of the present invention, there is provided a recording medium having a recording layer for recording a standing wave generated by first and second light beams emitted from the opposite surfaces thereof by way of first and second objective lenses and a reflection layer, the reflection layer producing a reflected light beam for controlling the first objective lens by reflecting the light beam emitted to the reflection layer by way of the first objective lens and a transmitted light beam for controlling the second objective lens by transmitting the first or second light beam.

With this arrangement, according to the present invention, when recording a standing wave on a recording layer by means of a predetermined optical disc apparatus, the focus position of the first light beam can be made to agree with a desired position by means of the first objective lens that is controlled for position according to the returning light beam from the reflection layer and the focus position of the second light beam can be made to agree with the desired position along with the focus position of the first light beam by controlling the position of the second objective lens according to outcome of detection of the first or second light beam after it is transmitted through the second objective lens.

Thus, according to the present invention, it is possible to realize an optical disc apparatus by which the focus position of the first light beam can be made to agree with a desired position by means of the first objective lens that is controlled for position according to the returning light beam from the reflection layer in the recording medium and the focus position of the second light beam can be made to agree with the desired position along with the focus position of the first light beam by controlling the position of the second objective lens according to outcome of detection of the first or second light beam after it is transmitted through the second objective lens so that a hologram representing information can be highly accurately recorded on or reproduced from an optical disc.

Additionally, according to the present invention, it is possible to realize a focus position control method by which the focus position of the first light beam can be made to agree with a desired position by means of the first objective lens that is controlled for position according to the returning light beam from the reflection layer in target of irradiation and the focus position of the second light beam can be made to agree with the desired position along with the focus position of the first light beam by controlling the position of the second objective lens according to outcome of detection of the first or second light beam after it is transmitted through the second objective lens so that the focus position of a light beam to be used for recording or reproducing a hologram can be highly accurately controlled.

Still additionally, according to the present invention, it is possible to realize a recording medium by which, when recording a standing wave on a recording layer by means of a predetermined optical disc apparatus, the focus position of the first light beam can be made to agree with a desired position by means of the first objective lens that is controlled for position according to the returning light beam from the reflection layer and the focus position of the second light beam can be made to agree with the desired position along with the focus position of the first light beam by controlling the position of the second objective lens according to outcome of detection of the first or second light beam after it is transmitted through the second objective lens so that a hologram representing information can be highly accurately recorded.

BEST MODE FOR CARRYING OUT THE INVENTION

Figure 1:
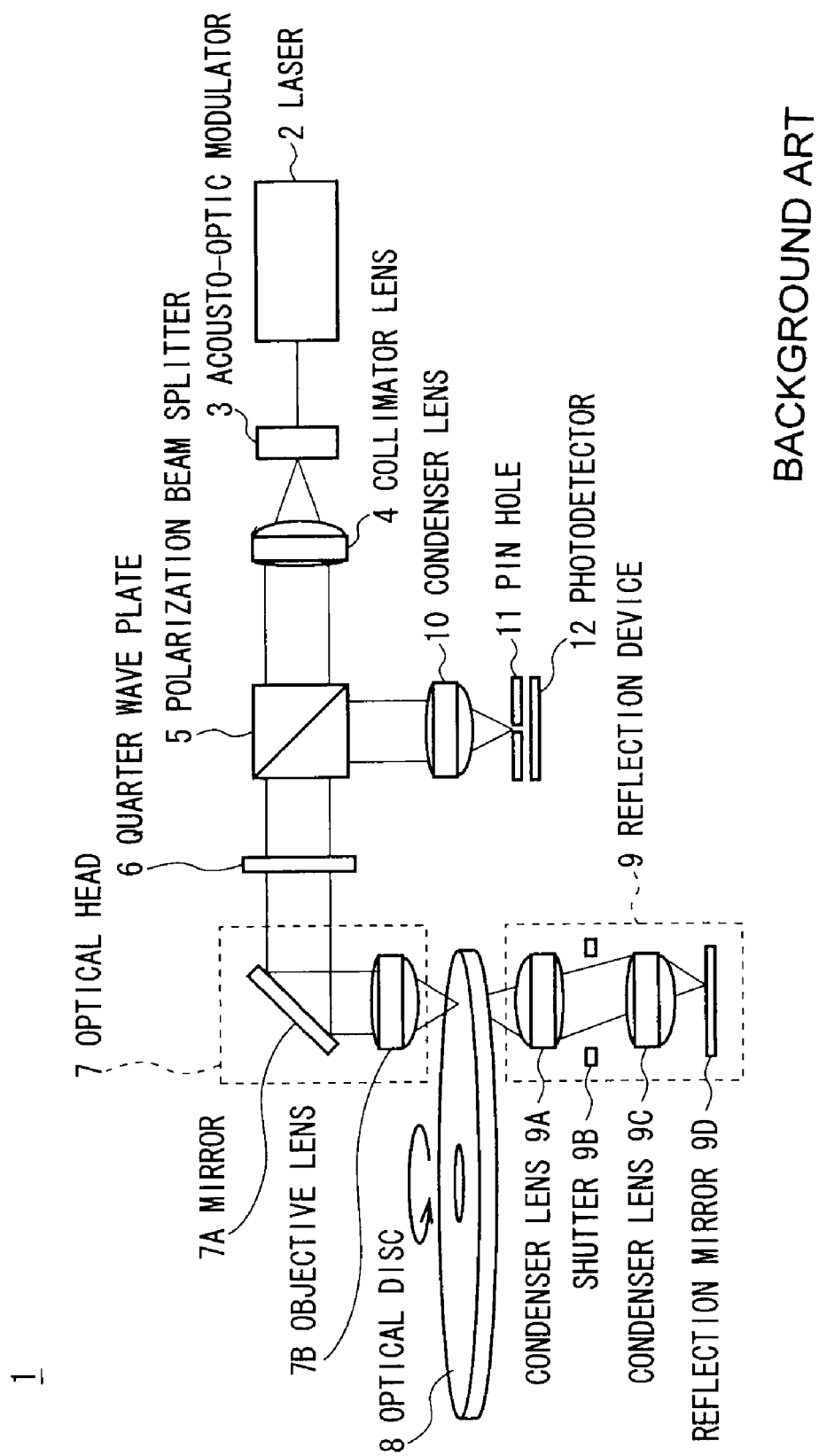
FIG. 1 is a schematic block diagram of a known standing wave recording type optical disc apparatus, showing the configuration thereof.

Now, an embodiment of the present invention will be described in detail by referring to the drawings.

(1) Configuration of Optical Disc

Firstly, an optical disc 100 that is a recording medium to be used for the present invention will be described. As shown in FIG. 3(A) illustrating an appearance of an optical disc, the optical disc 100 is formed to be disk-shaped as a whole with a diameter of about 120 mm similar to known CDs, DVDs and BDs and has a hole section 100H at the central part thereof.

As shown in FIG. 3(B) illustrating a cross section, the optical disc 100 has a recording layer 101 for recording information at the center, which is sandwiched between substrates 102 and 103 from the opposite surfaces.

Note that the recording layer 101 has a thickness t1 of about 0.3 mm and the substrates 102 and 103 have respective thicknesses t2 and t3 of about 0.6 mm.

The substrates 102 and 103 are made of, for example, a material such as polycarbonate, glass or the like and adapted to transmit light striking them from a surface thereof to the opposite surface thereof at a high transmission factor. The substrates 102 and 103 have a certain degree of strength so as to take a role of protecting the recording layer 101.

Note that the optical disc 100 has a substantially symmetrical structure relative to the recording layer 101 in the thickness direction and formed to maximally suppress the generation of warps and distortions as a whole that may arise with time. The surfaces of the substrates 102 and 103 may be made to prevent unnecessary reflections by means of non-reflection coating.

Figure 2:
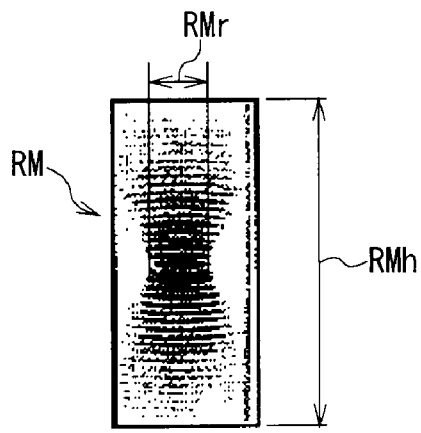
FIG. 2 is a schematic illustration of formation of a hologram.
Figure 2:
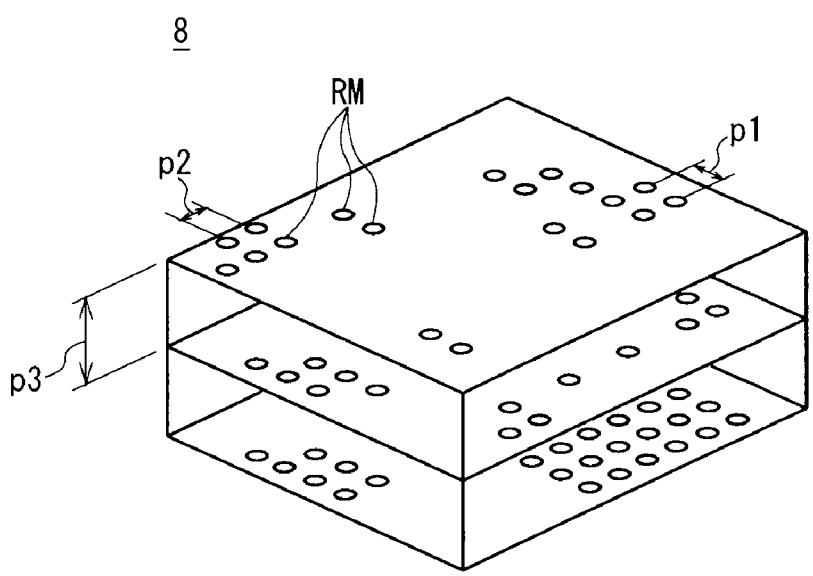

The recording layer 101 is a photopolymer whose refractive index changes according to the intensity of light emitted onto it like the optical disc 8 (FIG. 1) and adapted to react to a blue light beam having a wavelength of 405 nm. As shown in FIG. 3(B), a standing wave is generated in the recording layer 101 when two blue light beams Lb1 and Lb2 showing a relatively high intensity interfere with each other in the recording layer 101 so that an interference pattern having the nature of a hologram is formed as shown in FIG. 2(A).

Additionally, the recording layer 101 is adapted to show a refractive index equivalent to the substrates 102 and 103 relative to a blue light beam having a wavelength of 405 nm so that such a blue light beam is substantially not refracted at the interfaces of the recording layer 101 and the substrate 103 and so on.

The optical disc 100 has a reflection/transmission film 104 that operates as a reflection layer at the interface of the recording layer 101 and the substrate 102. The reflection/transmission film 104 is a dielectric multilayer film or the like and shows a wavelength selectivity of transmitting blue light beams Lb1, Lb2 and blue reproduction light beam Lb3 having a wavelength of 405 nm but reflecting a red light beam having a wavelength of 660 nm.

The reflection/transmission film 104 also has guide grooves formed for a tracking servo. More specifically, it has spiral tracks formed by lands and grooves like ordinary BD-R (recordable) discs. Addresses that are serial numbers are assigned to the tracks on the basis of a predetermined recording unit so that the track to be used for recording or reproducing information can be identified by its address.

Note that the guide grooves of the reflection/transmission film 104 (and hence the interface of the recording layer 101 and the substrate 102) may be replaced by pits or a combination of guide grooves and pits.

When a red light beam Lr1 is emitted onto the reflection/transmission film 104 from the side of the substrate 102, the reflection/transmission film 104 reflects the red light beam to the side of the substrate 102. The reflected light beam is referred to as red reflected light beam Lr2 hereinafter.

The red reflected laser beam Lr2 is, for example in the optical disk apparatus, assumed to be employed for controlling the position of a predetermined objective lens OL1 (and hence for focus control and tracking control) to position the focus Fr of the red light beam Lr1 that is converged by the objective lens OL1 on a track that is a target (to be referred to as target track hereinafter).

Note that, in the following description, the surface of the optical disc 100 at the side of the substrate 102 is referred to as guide surface 100A and the surface of the optical disc 100 at the side of the substrate 103 is referred to as recording light irradiation surface 100B.

When information is actually recorded on the optical disc 100, the red light beam Lr1 is converged by the objective lens OL1 that is controlled for position and focused on the target track of the reflection/transmission film 104 as shown in FIG. 3(B).

Additionally, the blue light beam Lb1 that shares the optical axis Lx with the red light beam Lr1 and converted by the objective lens Ol1 is transmitted through the substrate 102 and the reflection/transmission film 104 and focuses to a position corresponding to the rear side of the desired track (and hence at the side of the substrate 103) in the recording layer 101. At this time, the focus Fb1 of the blue light beam Lb1 is located remotely relative to the focus Fr on the common optical axis Lx by referring to the objective lens OL1.

Still additionally, a blue light beam Lb2 that has a wavelength same as and shares the same optical axis Lx with the blue light beam Lb1 is converged by an objective lens OL2 having optical characteristics equivalent to the objective lens OL1 from the opposite side of the blue light beam Lb1 (and hence at the side of the substrate 103) and emitted. At this time, the focus Fb2 of the blue light beam Lb2 is made to agree with the focus Fb1 of the blue light beam Lb1 as the position of the objective lens OL2 is controlled.

As a result, a standing wave is generated by the blue light beams Lb1 and Lb2 at the position of the focuses Fb1 and Fb2 that correspond to the rear side of the target track in the recording layer 101 and a recording mark RM of a relatively small interference pattern is recorded on the optical disc 100.

At this time, the blue light beams Lb1 and Lb2 that are convergent light beams lie one on the other in the recording layer 101 and a standing wave is generated at a part showing an intensity higher than a predetermined level to form a recording mark RM. Therefore, the recording mark RM shows shape of two cones that are bonded to each other at the bottoms thereof as a whole and has a slightly constricted central part (where the bottoms are bonded to each other) as shown in FIG. 2(A).

Note that, if the wavelength of the blue light beams Lb1 and Lb2 is $\lambda$ m and the numerical aperture of the objective lenses OL1 and OL2 are NA, the diameter RMr of the central constricted part of the recording mark RM is determined by formula (1) shown below.

$$RMr = 1.2 \times \lambda / NA \tag{1}$$

Additionally, if the refractive index of the recording layer 101 is n, the height RMh of the recording mark RM is determined by formula (2) shown below.

$$RMh = 4 \times n \times \lambda / NA^2 \tag{2}$$

For example, if the wavelength $\lambda$ is 405 nm, the numerical aperture NA is 0.5 and the refractive index n is 1.5, the diameter RMr=0.97 μm from the formula (1) and the height RMh=9.72 μm from the formula (2).

Additionally, the optical disc 100 is so designed that the thickness t1 (=0.3 mm) of the recording layer 101 is significantly greater than the height RMh of the recording mark RM. Therefore, the optical disc 100 is adapted to multilayer recording of laying a plurality of mark recording layers one on the other in the thickness direction of the optical disc 100 as shown in FIG. 2(B) as recording marks RM are recorded while switching the distance from the reflection/transmission film 104 to the inside of the recording layer 101 (to be referred to as depth hereinafter).

In this case, the depth of a recording mark RM is shifted as the depths of the focuses Fb1 and Fb2 of the blue light beams Lb1 and Lb2 are adjusted in the recording layer 101 of the optical disc 100. For example, if the distance p3 between mark recording layers is defined to be about 15 μm by taking the mutual interference of recording marks RM into consideration, about 20 mark recording layers can be formed in the recording layer 101 of the optical disc 100. Any of various different values other than about 15 μm may be selected for the distance p3 by taking the mutual interference of recording marks RM into consideration.

On the other hand, when information is reproduced from the optical disc 100, the position of the objective lens OL1 is so controlled that the red light beam Lr1 that is converged by the objective lens OL1 is focused to the target track of the reflection/transmission film 104 as in the case of recording information.

Additionally, the optical disc 100 is designed so that the focus Fb1 of the blue light beam Lb1 transmitted through the substrate 102 and the reflection/transmission film 104 by way of the same objective lens OL1 comes to the position that corresponds to the "rear side" of the target track and is located at the target depth in the recording layer 101 (to be referred to as target mark position hereinafter).

At this time, the recording mark RM that is recorded at the position of the focus Fb1 generates a blue reproduction light beam Lb3 from the recording mark RM recorded at the target mark position due to the nature as a hologram. The blue reproduction light beam Lb3 has optical characteristics equivalent to the blue light beam Lb2 that is emitted when recording the recording mark RM and hence proceeds in the direction same as the blue light beam Lb2 and hence from the inside of the recording layer 101 toward the side of the substrate 102, while diverging.

In this way, when information is recorded in the optical disc 100, a recording mark RM is formed as the information, in the recording layer 101 at the position where the focuses Fb1 and Fb2 lie one on the other and hence at the target mark position located at the rear side of the target track and showing the target depth at the reflection/transmission film 104 as a red light beam Lr1 and blue light beams Lb1 and Lb2 are used respectively for position control and for information recording.

On the other hand, when recorded information is reproduced from the optical disc 100, a blue reproduction light beam Lb3 is generated from the recording mark RM recorded at the position of the focus Fb1 and hence at the target mark position as a red light beam Lr1 and blue light beam Lb1 are used respectively for position control and for information reproduction.

(2) Configuration of Optical Disc Apparatus

Figure 4:
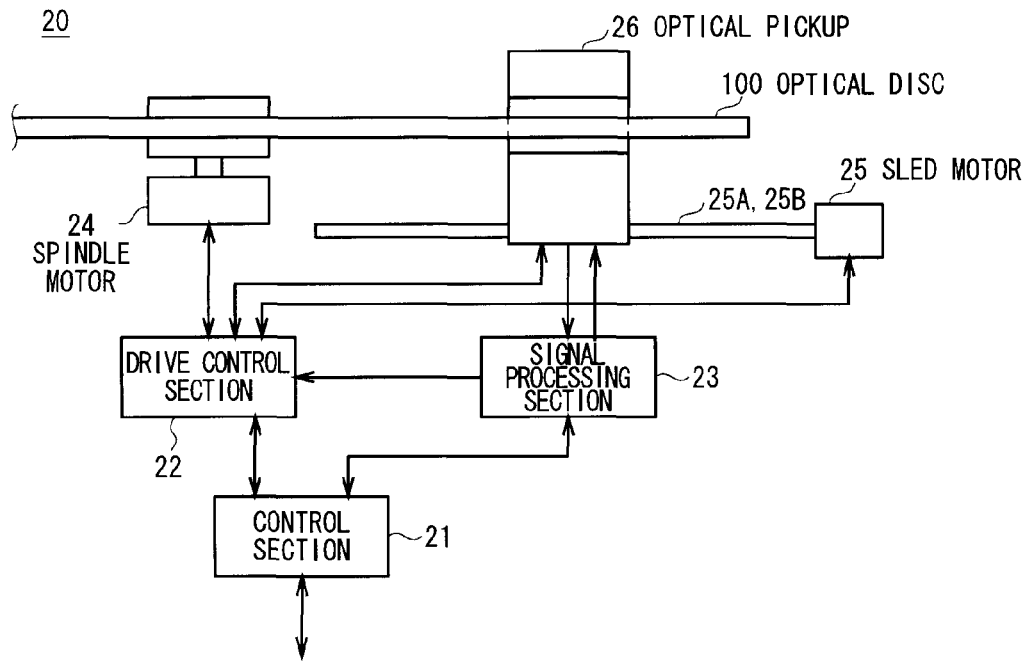
FIG. 4 is a schematic block diagram of an embodiment of optical disc apparatus according to the present invention, showing the configuration thereof.

Now, an optical disc apparatus 20 that corresponds to the above-described optical disc 100 will be described below. As shown in FIG. 4, the optical disc apparatus 20 has a control section 21 that coordinates and controls the entire apparatus.

The control section 21 is formed around a CPU (central processing unit) that is not shown and adapted to read out any of various programs such as a basic program or an information recording program from a ROM (read only memory) that is not shown and develop it in a RAM (random access memory) that is not shown to execute any of various processes such as an information recording process.

For example, as the control section 21 receives an information recording command, information to be recorded and recording address information from an external apparatus or the like that is not shown in a state where an optical disc 100 is mounted in it, the control section 21 supplies a drive command and the recording address information to a drive control section 22 and at the same time supplies the information to be recorded to a signal processing section 23. Note that the recording address information is information that indicates the address of the recording layer 101 of the optical disc 100 where the information is to be recorded among the addresses assigned to the recording layer 101.

The drive control section 22 drives the optical disc 100 to rotate at a predetermined rotary speed by driving and controlling a spindle motor 24 according to the drive command and moves an optical pickup 26 to the position that corresponds to the recording address information in a radial direction of the optical disc 100 (and hence in a direction toward the inner periphery or in a direction toward the outer periphery) along moving axes 25A and 25B by driving and controlling a sled motor 25.

The signal processing section 23 generates a recording signal by executing various signal processes such as a predetermined coding process and a predetermined modulation process on the supplied information to be recorded and supplies the recording signal to the optical pickup 26.

Figure 5:
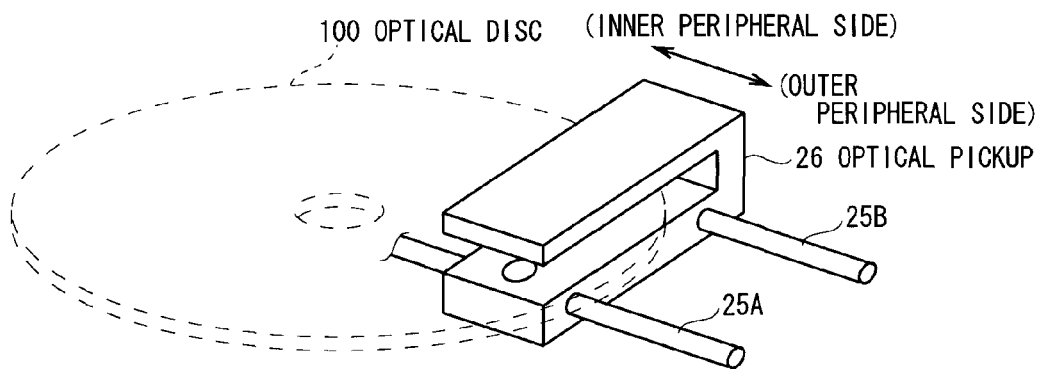
FIG. 5 is a schematic perspective view of an optical pickup.

The optical pickup 26 has a substantially sideways U-shaped lateral view as shown in FIG. 5 and is adapted to emit light beams onto the optical disc 100 from the opposite surfaces thereof, so as to make the focuses of the light beams agree as shown in FIG. 3(B).

The optical pickup 26 makes the position of irradiation of the light beams agree with the track indicated by the recording address information (to be referred to as target track hereinafter) in the recording layer 101 of the optical disc 100 and records a recording mark RM that corresponds to the recording signal from the signal processing section 23 by way of focus control and tracking control under control of the drive control section 22 (FIG. 4) (as will be described in greater detail hereinafter).

Additionally, as the control section 21 receives an information reproduction command and reproduction address information indicating the address of the corresponding recorded information from an external apparatus (not shown), for example, the control section 21 supplies a drive command to the drive control section 22 and also supplies a reproduction process command to the signal processing section 23.

As in the case of recording information, the drive control section 22 drives and controls the spindle motor 24 so as to drive the optical disc 100 to rotate at a predetermined rate of revolutions. The drive control section 22 also drives and controls the sled motor 25 so as to move the optical pickup 26 to a position that corresponds to the reproduction address information.

The optical pickup 26 operates for focus control and tracking control to make the position of irradiation of the light beams agree with the track in the recording layer 101 of the optical disc 100 indicated by the reproduction address information (and hence the target track) and also makes the light beams emit with a predetermined quantity of light under the control of the drive control section 22 (FIG. 4). At this time, the optical pickup 26 detects the reproduction light beam generated from the recording mark RM of the recording layer 101 in the optical disc 100 and supplies a detection signal representing its quantity of light to the signal processing section 23 (as will be described in greater detail hereinafter).

The signal processing section 23 generates reproduction information by executing various predetermined signal processes including a demodulation process and a decoding process on the supplied detection signal and supplies the reproduction information to the control section 21. In response, the control section 21 sends out the reproduction information to an external apparatus (not shown).

In this way, the optical disc apparatus 20 records information on the target track in the recording layer 101 of the optical disc 100 and reproduces information from the target track by controlling the optical pickup 26 by means of the control section 21.

(3) Configuration of Optical Pickup

Figure 6:
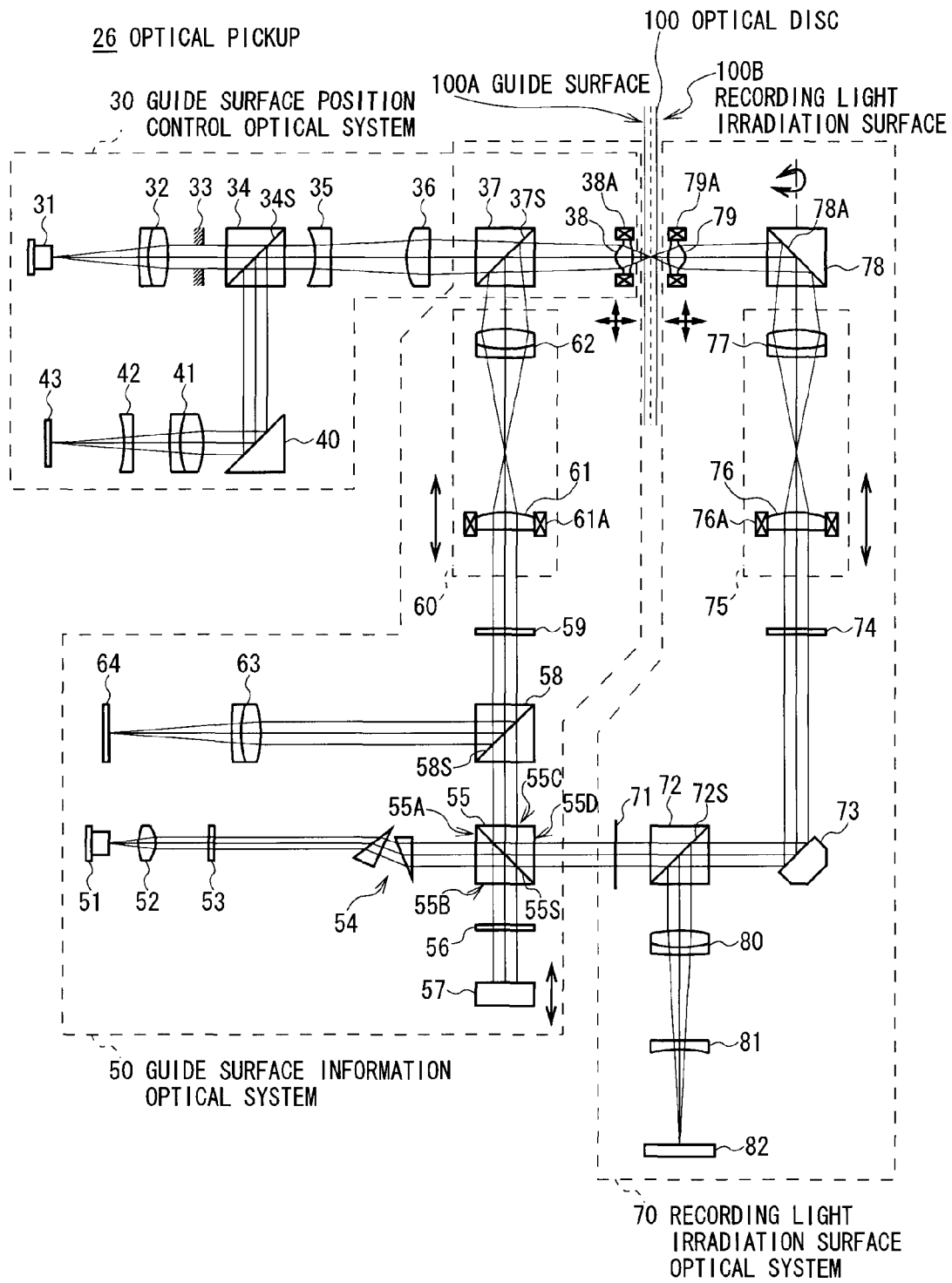
FIG. 6 is a schematic block diagram of an optical pickup, showing the configuration thereof.

Now, the configuration of the optical pickup 26 will be described below. As schematically illustrated in FIG. 6, a number of optical parts are arranged in the optical pickup 26, which is roughly formed by a guide surface position control optical system 30, a guide surface information optical system 50 and a recording light irradiation surface optical system 70.
(3-1) Configuration of Guide Surface Red Optical System The guide surface position control optical system 30 emits a red light beam Lr1 onto the guide surface 100A of the optical disc 100 and receives the red reflected light beam Lr2 produced as the red light beam Lr1 is reflected by the optical disc 100.

Figure 7:
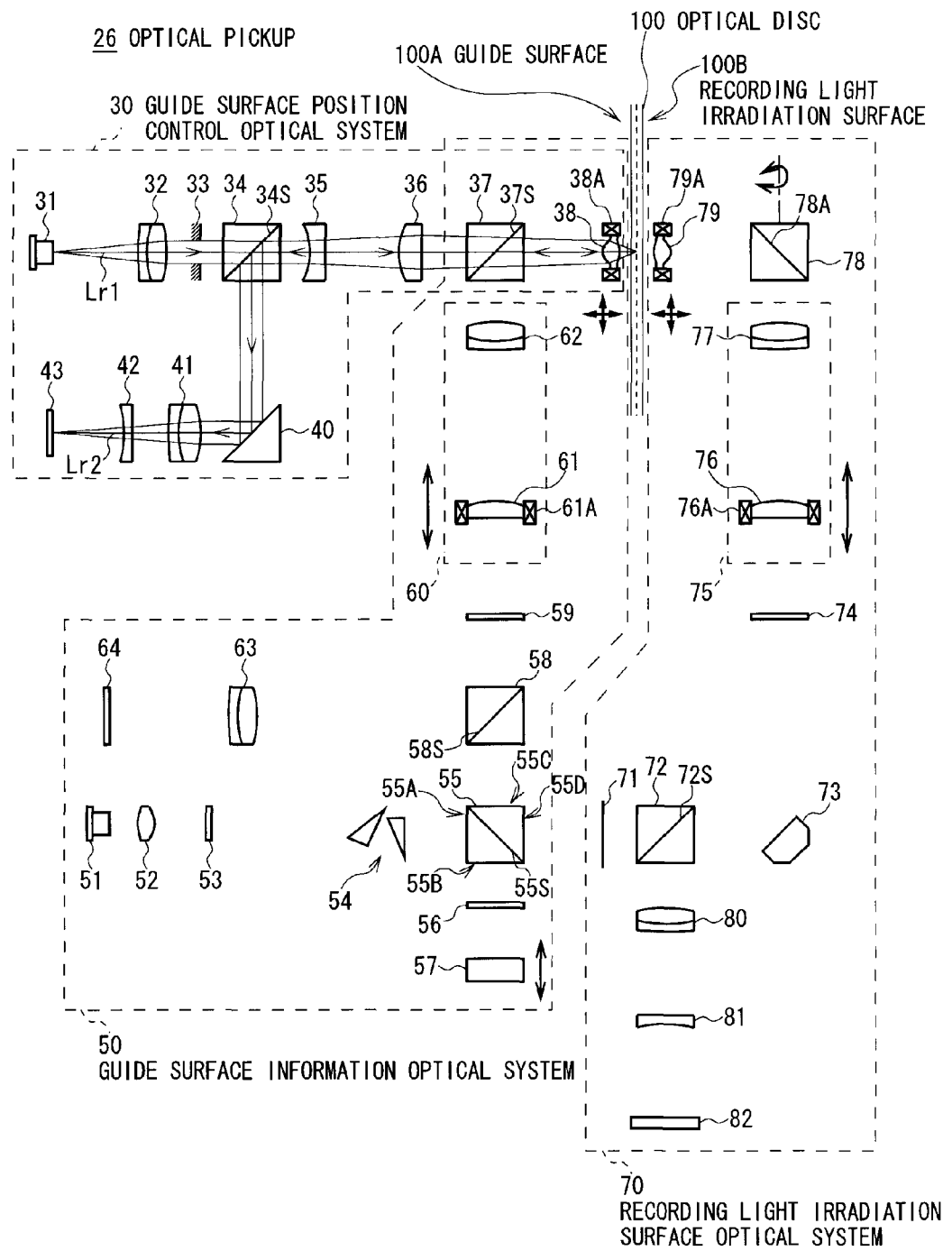
FIG. 7 is a schematic illustration of a light path of a red light beam.

Referring to FIG. 7, a laser diode 31 of the guide surface position control optical system 30 is adapted to emit a red laser beam with a wavelength of about 660 nm. The laser diode 31 emits a red light beam Lr1 that is divergent light with a predetermined quantity of light and makes it enter a collimator lens 32 under the control of the control section 21 (FIG. 4). The collimator lens 32 converts the red light beam Lr1 from divergent light into parallel light and makes it enter a non-polarizing beam splitter 34 by way of a slit 33.

The non-polarizing beam splitter 34 transmits the red light beam Lr1 at a reflection/transmission surface 34A by a ratio of about 50% and makes the transmitted red light beam enter a correction lens 35. The correction lenses 35 and 36 diverge the red light beam Lr1 once and then converge it before making it enter a dichroic prism 37.

A reflection/transmission surface 37S of the dichroic prism 37 has a so-called wavelength selectivity of showing a transmission factor and a reflection factor that vary depending on the wavelength of light beam and is adapted to transmit a red light beam to a ratio of almost 100% and reflect a blue light beam to a ratio of almost 100%. Therefore, the dichroic prism 37 transmits the red light beam Lr1 through the reflection/transmission surface 37S and makes it enter an objective lens 38.

The objective lens 38 converges the red light beam Lr1 and emits it toward the guide surface 100A of the optical disc 100. At this time, the red light beam Lr1 is transmitted through the substrate 102 and reflected by the reflection/transmission film 104 to become a red reflected light beam Lr2 proceeding in the opposite direction relative to the red light beam Lr1 as shown in FIG. 3(B).

Note that the objective lens 38 is designed so as to be optimized for a blue light beam Lb1 and operate as a condenser lens having a numerical aperture (NA) of 0.41 for a red light beam Lr1 in terms of, for example, optical distance from the slit 33, the correction lenses 35 and 36, etc.

Thereafter, the red reflected light beam Lr2 is transmitted sequentially through the objective lens 38, the dichroic prism 37 and the correction lenses 36 and 35 and collimated before it is made to enter the non-polarizing beam splitter 34.

The non-polarizing beam splitter 34 reflects the red reflected light beam Lr2 by a ratio of about 50% so as to emit it to a mirror 40, which reflects the red reflected light beam Lr2 once again and makes it enter a condenser lens 41.

The condenser lens 41 converges the red reflected light beam Lr2 and makes it have astigmatism by means of a cylindrical lens 42 before it emits the red reflected light beam Lr2 to a photodetector 43.

Meanwhile, since the rotating optical disc 100 can produce surface blurring in the optical disc apparatus 20, the relative position of the target track relative to the guide surface position control optical system 30 can fluctuate.

For this reason, in order to make the focus Fr (FIG. 3(B)) of the red light beam Lr1 follow the target track by the guide surface position control optical system 30, it is necessary to move the focus Fr in the focusing direction, which is either the direction of moving the focus Fr close to the optical disc 100 or the direction of moving the focus Fr away from the optical disc 100, and also in the tracking direction, which is either the direction of moving the focus Fr toward the inner peripheral side or the direction of moving the focus Fr toward the outer peripheral side of the optical disc 100.

For this reason, the objective lens 38 is so arranged that it can be driven in biaxial directions of the focusing direction and the tracking direction by means of a biaxial actuator 38A.

Additionally, the optical positions of various optical parts of the guide surface position control optical system 30 (FIG. 7) are so adjusted that the in-focus state of the red light beam Lr1 that is observed when the red light beam Lr1 is converged by the objective lens 38 and emitted to the reflection/transmission film 104 of the optical disc 100 is reflected to the in-focus state of the red reflected light beam Lr2 that is observed when the red reflected light beam Lr2 is converged by the condenser lens 41 and emitted to the photodetector 43.

Figure 3:
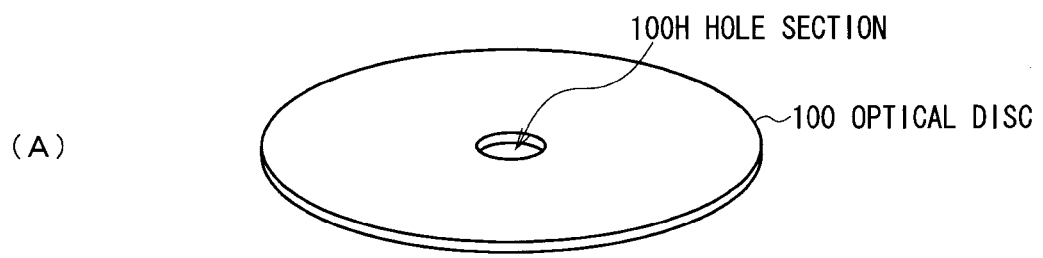
FIG. 3 is a schematic illustration showing the configuration of an embodiment of optical disc according to the present invention.
Figure 3:
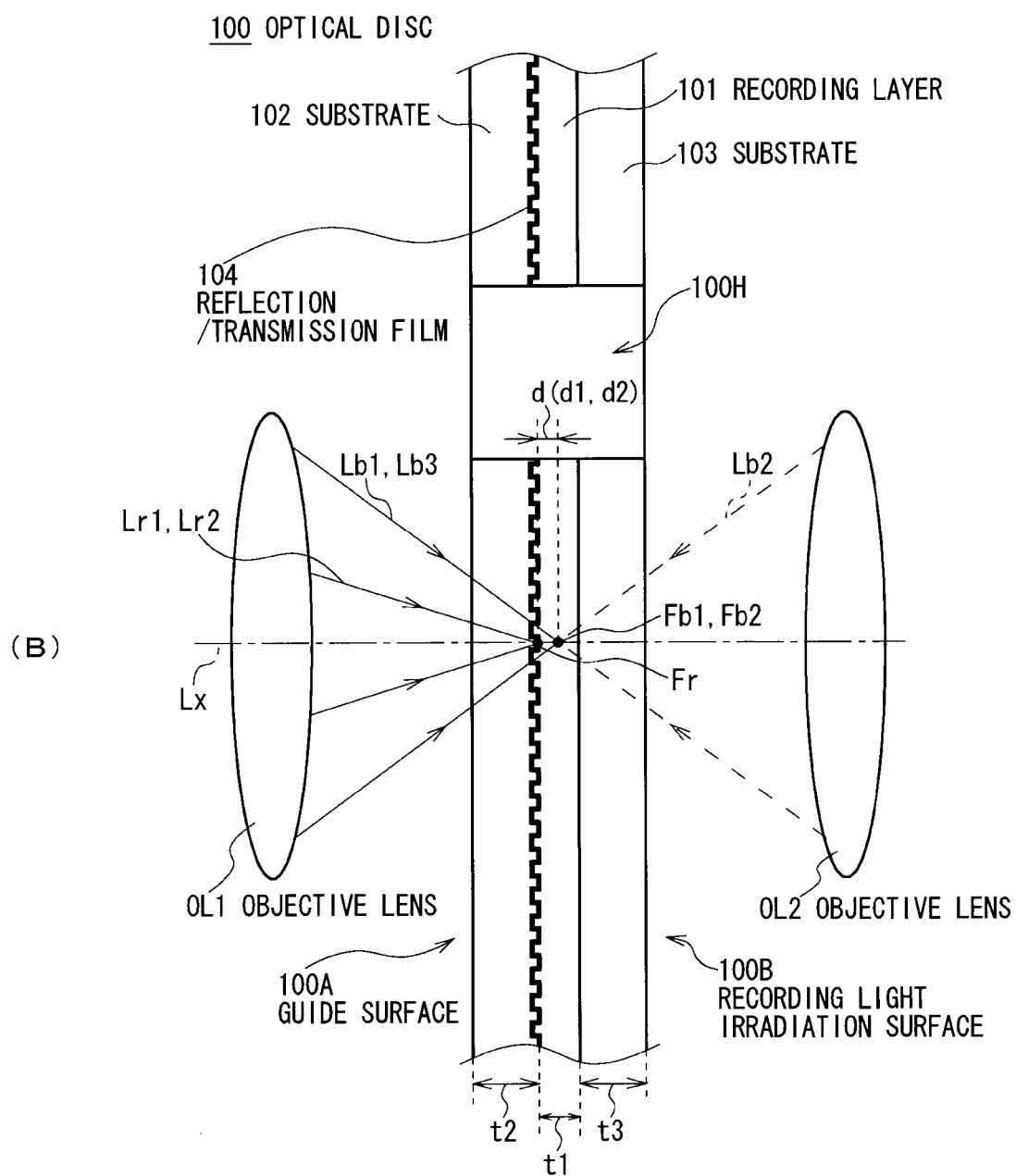
Figure 8:
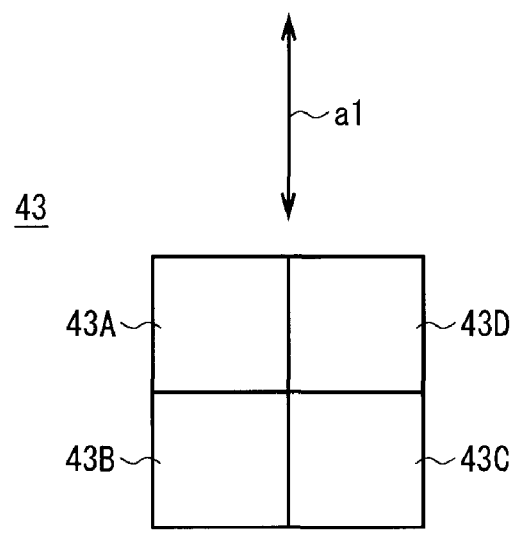
FIG. 8 is a schematic illustration showing the configuration of the detection regions of a photodetector.

As shown in FIG. 8, the photodetector 43 has four detection regions 43A, 43B, 43C and 43D produced by dividing the surface to be irradiated with a red reflected light beam Lr2 so as to make it appear like a grid. Note that the direction indicated by arrow a1 (the longitudinal direction in FIG. 8) corresponds to the running direction of the track when the red light beam Lr1 is emitted to the reflection/transmission film 104 (FIG. 3)

The photodetector 43 detect parts of the red reflected light beam Lr2 respectively by the detection regions 43A, 43B, 43C and 43D and generates detection signals SDAr, SDBr, SDCr and SDDr according to the detected quantities of light, which are then sent out to the signal processing section 23 (FIG. 4).

The signal processing section 23 is adapted to operate for focus control by means of a so-called astigmatism method. It computationally determines the focus error signal SFEr by means of formula (3) shown below and supplies it to the drive control section 22.

$$SFEr=(SDAr+SDCr)-(SDBr+SDDr) \quad (3)$$

The focus error signal SFEr represents the amount of the gap between the focus Fr of the red light beam Lr1 and the reflection/transmission film 104 of the optical disc 100.

The signal processing section 23 is also adapted to operate for tracking control by means of a so-called push-pull method. It computationally determines the tracking error signal STEr by means of formula (4) shown below and supplies it to the drive control section 22.

$$STEr=(SDAr+SDDr)-(SDBr+SDCr) \quad (4)$$

The tracking error signal STEr represents the amount of the gap between the focus Fr of the red light beam Lr1 and target track of the reflection/transmission film 104 of the optical disc 100.

The drive control section 22 generates a focus drive signal SFDr according to the focus error signal SFEr and operates for feedback control (i.e., focus control) of the objective lens 38 so as to focus the red light beam Lr1 to the reflection/transmission film 104 of the optical disc 100 by supplying the focus drive signal SFDr to the biaxial actuator 38A.

Additionally, the drive control section 22 generates a tracking drive signal STDr according to the tracking error signal STEr and operates for feedback control (i.e., tracking control) of the objective lens 38 so as to focus the red light beam Lr1 to target track of the reflection/transmission film 104 of the optical disc 100 by supplying the tracking drive signal STDr to the biaxial actuator 38A.

In this way, the guide surface position control optical system 30 emits the red light beam Lr1 to the reflection/transmission film 104 of the optical disc 100 and supplies the results of receiving a red reflected light beam Lr2 that is the reflected beam of the red light beam Lr1 to the signal processing section 23. In response, the drive control section 22 makes the objective lens 38 to focus the red light beam Lr1 to the target track of the reflection/transmission film 104 by focus control and tracking control.

(3-2) Configuration of Guide Surface Blue Optical System

The guide surface information optical system 50 emits a blue light beam Lb1 to the guide surface 100A of the optical disc 100 and receives a blue light beam Lb2 or a blue reproduction light beam Lb3 coming from the optical disc 100.

(3-2-1) Irradiation of Blue Light Beam

Figure 9:
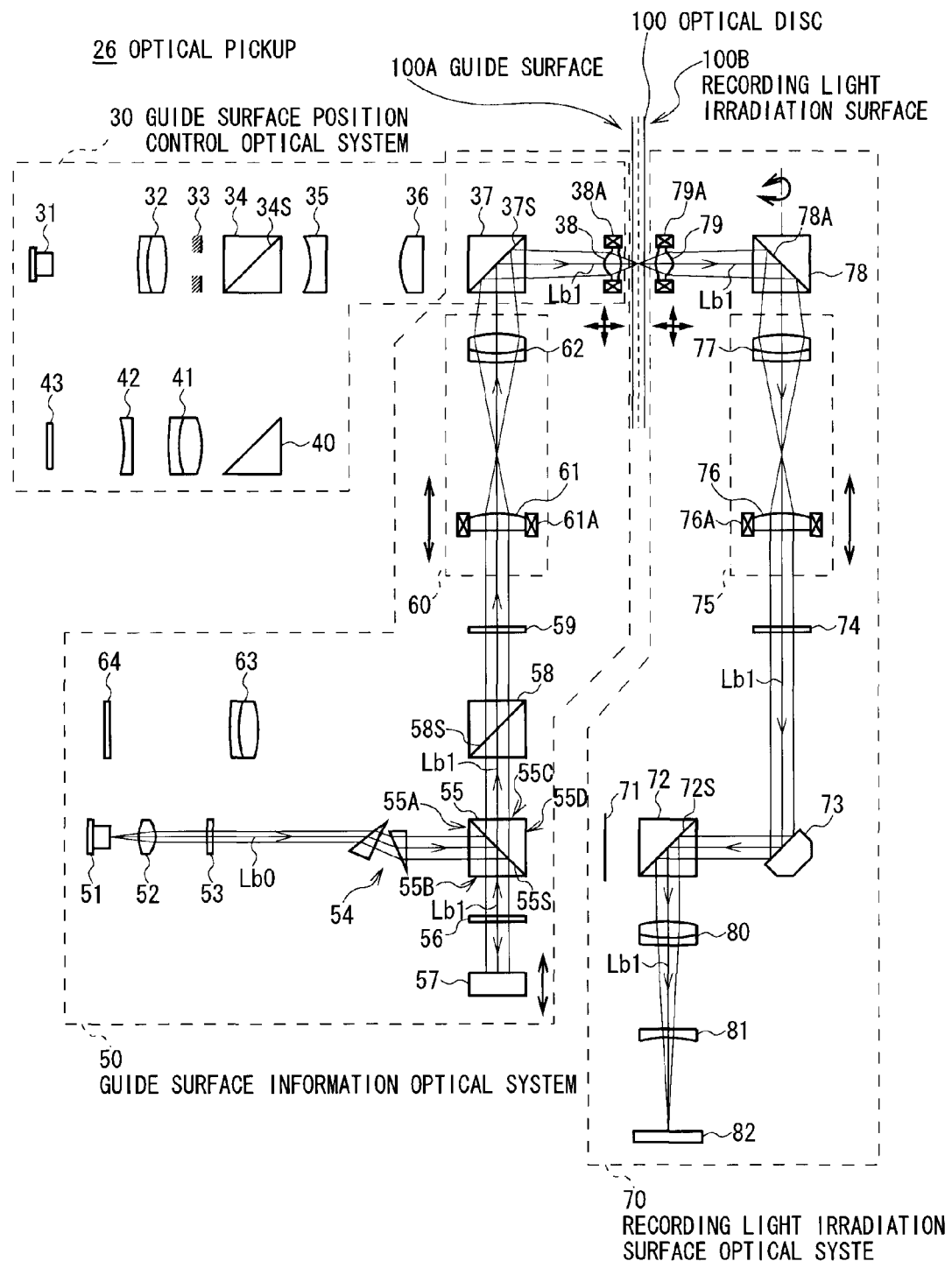
FIG. 9 is a schematic illustration of light path (1) of a blue light beam.

Referring to FIG. 9, a laser diode 51 of the guide surface information optical system 50 emits a blue laser beam of a wavelength of about 405 nm. More specifically, the laser diode 51 emits a blue light beam Lb0 that is divergent light under the control of the control section 21 (FIG. 4) and makes it enter a collimator lens 52. The collimator lens 52 converts the blue light beam Lb0 from divergent light into parallel light and makes it enter a half wave plate 53.

At this time, the blue light beam Lb0 is made to enter a surface 55A of a polarization beam splitter 55 after the direction of polarization is rotated by a predetermined angle by the half wave plate 53 and an intensity distribution is formed by an anamorphic prism.

The polarization beam splitter 55 is adapted to transmit or reflect a light beam at a reflection/transmission surface 55S thereof at a ratio that varies depending on the direction of polarization of the light beam. For example, the reflection/transmission surface 55S may be adapted to reflect a p-polarized light beam by a ratio of about 50% and transmit it about by the remaining 50% but transmit an s-polarized light beam to about 100%.

Actually, the polarization beam splitter 55 reflects a blue light beam Lb0 that is p-polarized light by a ratio of about 50% by means of the reflection/transmission surface 55S and makes it enter a quarter wave plate 56 from a surface 55B while the polarization beam splitter 55 transmits the p-polarized light about by the remaining 50% and makes it strike a shutter 71 from a surface 55D. In the following description, the blue light beam reflected by the reflection/transmission surface 55S is referred to as blue light beam Lb1 and the blue light beam transmitted through the reflection/transmission surface 55S is referred to as blue light beam Lb2.

The quarter wave plate 56 converts the blue light beam Lb1 from linearly polarized light into circularly polarized light and emits it to a movable mirror 57. The quarter wave plate 56 also converts the blue light beam Lb1 reflected by the movable mirror 57 from circularly polarized light into linearly polarized light and makes it enter the surface 55B of the polarization beam splitter 55 once again.

At this time, for instance, the blue light beam Lb1 is converted from p-polarized light into left-circularly polarized light by the quarter wave plate 56, then from left-circularly polarized light into right-circularly polarized light when it is reflected by the movable mirror 57 and then again from right-circularly polarized light into s-polarized light by the quarter wave plate 56. In other words, the sense of polarization of the blue light beam Lb1 differs between when it is emitted from the surface 55B and when it enters the surface 55B after being reflected by the movable mirror 57.

The polarization beam splitter 55 transmits the blue light beam Lb1 through the reflection/transmission surface 55S and makes it enter a polarization beam splitter 58 from the surface 55C depending on the sense of polarization (s-polarization) of the blue light beam Lb1 entering from the surface 55B.

As a result, the guide surface information optical system 50 elongates the optical path length of the blue light beam Lb1 by means of the polarization beam splitter 55, the quarter wave plate 56 and the movable mirror 57.

The reflection/transmission surface 55S of the polarization beam splitter 58, for example, reflects a p-polarized light beam to a ratio of about 100% and transmits a s-polarized light beam to a ratio of about 100%. Actually, the polarization beam splitter 58 thoroughly transmits the blue light beam Lb1 at a reflection/transmission surface 58S and converts it from linearly polarized light (s-polarized light) into circularly polarized light (right-circularly polarized light) by means of a quarter wave plate 59 before it is entered to a relay lens 60.

The relay lens 60 converts the blue light beam Lb1 from parallel light into convergent light by means of a movable lens 61 and then converts the blue light beam Lb1 that becomes divergent light after the convergence into convergent light once again by means of a fixed lens 62 before it is entered to the dichroic prism 37.

The movable lens 61 is adapted to be moved in the direction of the optical axis of the blue light beam Lb1 by an actuator 61A. Actually, the relay lens 60 can change the state of convergence of the blue light beam Lb1 emitted from the fixed lens 62 by moving the movable lens 61 by means of the actuator 61A under the control of the control section 21 (FIG. 4).

The dichroic prism 37 reflects the blue light beam Lb1 by means of the reflection/transmission surface 37S and makes it enter the objective lens 38 depending on the wavelength of the blue light beam Lb1. Note that the sense of circular polarization of the blue light beam Lb1 is inverted when reflected by the reflection/transmission surface 37S, for example, from right-circularly polarized light to left-circularly polarized light.

The objective lens 38 converges the blue light beam Lb1 and emits it to the guide surface 100A of the optical disc 100. Note that the objective lens 38 operates as a condenser lens having a numerical aperture (NA) of 0.5 for the blue light beam Lb1 because of the its relationship with the relay lens 60 in terms of optical distance and so on.

At this time, the blue light beam Lb1 is transmitted through the substrate 102 and the reflection/transmission film 104 and focused in the recording layer 101 as shown in FIG. 3(B). The position of the focus Fb1 of the blue light beam Lb1 is determined according to the state of convergence when it is emitted from the fixed lens 62 of the relay lens 60. In other words, the focus Fb1 is moved either toward the side of the guide surface 100A or toward the side of the recording light irradiation surface 100B in the recording layer 101 depending on the position of the movable lens 61.

More specifically, the guide surface information optical system 50 is designed such that the moving distance of the movable lens 61 and the moving distance of the focus Fb1 of the blue light beam Lb1 show proportionality. For example, the focus Fb1 of the blue light beam Lb1 may be moved by 30 μm as the movable lens 61 is moved by 1 mm.

Actually, the guide surface information optical system 50 is so designed that the depth d1 of the focus Fb1 of the blue light beam Lb1 (FIG. 3(B)) in the recording layer 101 of the optical disc 100 (in other words, the distance from the reflection/transmission film 104) is adjusted as a result of that the position of the movable lens 61 is controlled by the control section 21 (FIG. 4).

The blue light beam Lb1 becomes divergent light after being converged to the focus Fb1 and then transmitted through the recording layer 101 and the substrate 103 before it is emitted from the recording light irradiation surface 100B and enters a objective lens 79 (as will be described in greater detail hereinafter).

In this way, the guide surface information optical system 50 emits a blue light beam Lb1 to the optical disc 100 from the side of the guide surface 100A thereof, positions the focus Fb1 of the blue light beam Lb1 in the recording layer 101 and adjusts the depth d1 of the focus Fb1 according to the position of the movable lens 61 of the relay lens 60.

(3-2-2) Reception of Blue Light Beam

Meanwhile, the optical disc 100 transmits the blue light beam Lb2 emitted toward the recording light irradiation surface 100B thereof from the objective lens 79 of the recording light irradiation surface optical system 70 and emits it from the guide surface 100A as divergent light (as will be described in greater detail hereinafter). Note that the blue light beam Lb2 is made to be circularly polarized light (e.g., right-circularly polarized light).

Figure 10:
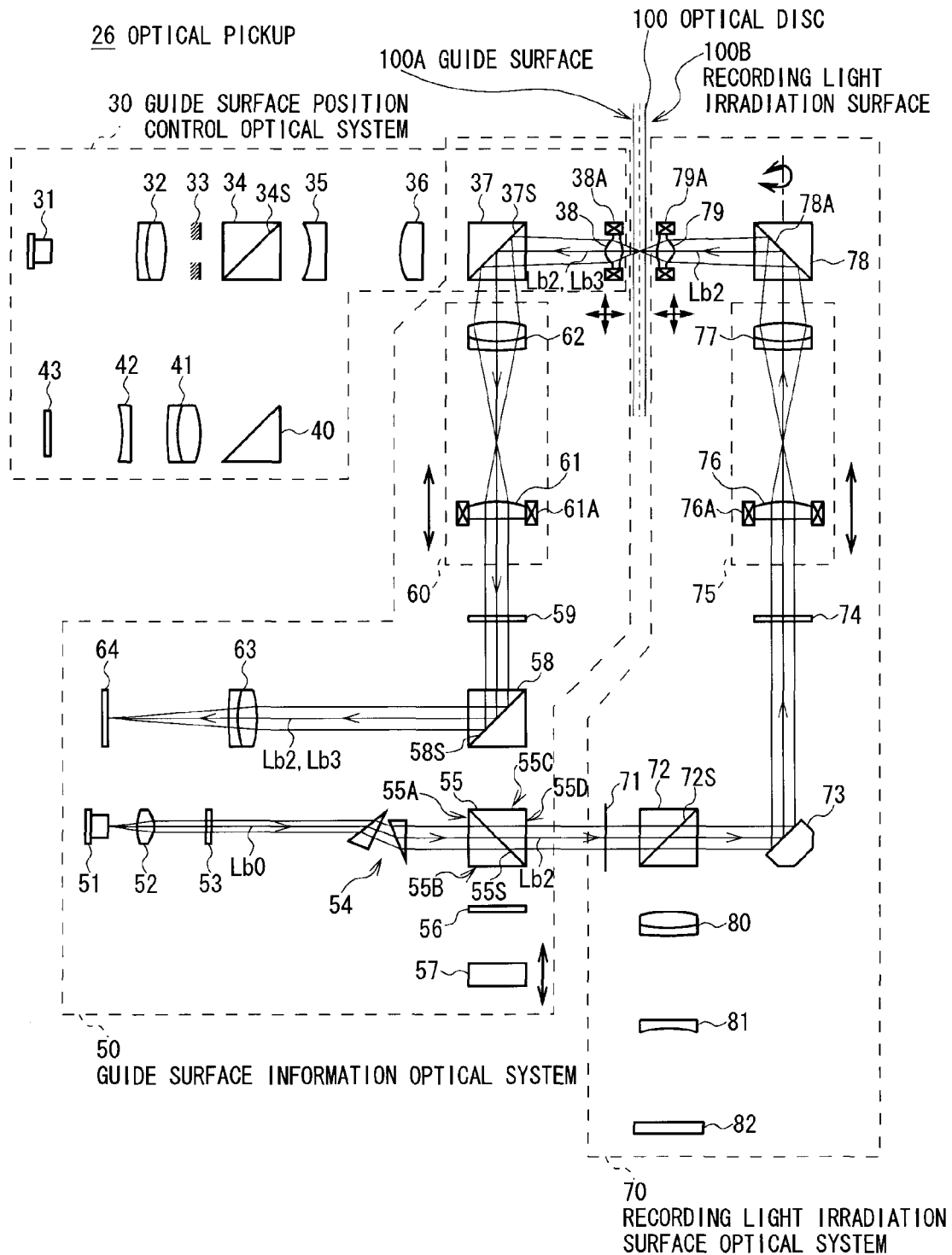
FIG. 10 is schematic illustration of light path (2) of a blue light beam.

At this time, in the guide surface information optical system 50, the blue light beam Lb2 is converged to a certain extent by the objective lens 38 and then reflected by the dichroic prism 37 before it is made to enter the relay lens 60 as shown in FIG. 10. Note that, when the blue light beam Lb2 is reflected by the reflection/transmission surface 37S, the sense of circular polarization thereof is inverted, for example, from right-circularly polarized light to left-circularly polarized light.

Subsequently, the blue light beam Lb2 is converted into parallel light by the fixed lens 62 and the movable lens 61 of the relay lens 60 and also from circularly polarized light (left-circularly polarized light) into linearly polarized light (p-polarized light) by the quarter wave plate 59 before it is made to enter the polarization beam splitter 58.

The polarization beam splitter 58 reflects the blue light beam Lb2 and makes it enter a condenser lens 63 depending on the sense of polarization of the blue light beam Lb2. The condenser lens 63 converges the blue light beam Lb2 and emits it onto a photodetector 64.

Note that the optical parts in the guide surface information optical system 50 are so arranged as to focus the blue light beam Lb2 to the photodetector 64.

The photodetector 64 detects the quantity of light of the blue light beam Lb2, generates a reproduction detection signal SDp according to the detected quantity of light and supplies the signal to the signal processing section 23 (FIG. 4).

However, the reproduction detection signal SDp generated by the photodetector 64 according to the quantity of light of the blue light beam Lb2 has not particular application. Therefore, the signal processing section 23 (FIG. 4) to which the reproduction detection signal SDp is supplied does not execute any particular process on it.

On the other hand, in the optical disc 100, when a recording mark RM is recorded in the recording layer 101 and the focus Fb1 of the blue light beam Lb1 is made to agree with the recording mark RM, a blue reproduction light beam Lb3 is generated from the recording mark RM due to the nature of the recording mark as a hologram.

The blue reproduction light beam Lb3 is a reproduction of the light beam that is emitted beside the blue light beam Lb1 when the recording mark RM is recorded, or the blue light beam Lb2, because of the principle of hologram. Therefore, the blue reproduction light beam Lb3 follows the optical path same as the optical path of the blue light beam Lb2 in the guide surface information optical system 50 and ultimately is emitted to the photodetector 64.

As pointed out above, the optical parts of the guide surface information optical system 50 are so arranged as to focus the blue light beam Lb2 to the photodetector 64. Therefore, the blue reproduction light beam Lb3 is focused to the photodetector 64 just like the blue light beam Lb2.

The photodetector 64 detects the quantity of light of the blue light beam Lb3 and generates a reproduction detection signal SDp according to the detected quantity of light and supplies the signal to the signal processing section 23 (FIG. 4).

In this case, the reproduction detection signal SDp represents a piece of information recorded on the optical disc 100. Thus, the signal processing section 23 generates reproduction information by executing predetermined processes including a demodulation process and a decoding process on the reproduction detection signal SDp and supplies the reproduction information to the control section 21.

In this way, the guide surface information optical system 50 receives the blue light beam Lb2 or the blue reproduction light beam Lb3 entering the objective lens 38 from the guide surface 100A of the optical disc 100 and supplies the results of the reception to the signal processing section 23.

(3-3) Configuration of Recording Light Irradiation Surface Optical System

The recording light irradiation surface optical system 70 (FIG. 6) is adapted to emit the blue light beam Lb2 to the recording light irradiation surface 100B of the optical disc 100 and receive the blue light beam Lb1 emitted from the guide surface information optical system 50 and transmitted through the optical disc 100.

(3-3-1) Irradiation of Blue Light Beam

Referring to FIG. 10, the polarization beam splitter 55 of the guide surface information optical system 50 transmits the blue light beam Lb0 that is p-polarized light at the reflection/transmission surface 55S by a ratio of about 50% and makes it enter the shutter 71 from the surface 55D as blue light beam Lb2 as pointed out above.

The shutter 71 blocks or transmits the blue light beam Lb2 under the control of the control section 21 (FIG. 4) and, when the shutter 71 transmits the blue light beam Lb2, it makes the blue light beam Lb2 enter a polarization beam splitter 72.

Note that the shutter 71 may be a mechanical shutter that blocks or transmits the blue light beam Lb2 by mechanically moving a shutter plate for blocking the blue light beam Lb2 or a liquid crystal shutter that blocks or transmits the blue light beam Lb2 by changing the voltage applied to a liquid crystal panel.

For example, a reflection/transmission surface 72S of the polarization beam splitter 72 may be adapted to transmit a p-polarized light beam to a ratio of about 100% and reflect an s-polarized light beam to a ratio of about 100%. Actually, the polarization beam splitter 72 wholly transmits a blue light beam Lb2 that is p-polarized light and reflects it by means of a mirror 73 before converting it from linearly polarized light (p-polarized light) into circularly polarized light (left-circularly polarized light) by means of a quarter wave plate 74 and making it enter a relay lens 75.

The relay lens 75 has a configuration similar to the relay lens 60 and has a movable lens 76, an actuator 76A and a fixed lens 77, which respectively correspond to the movable lens 61, the actuator 61A and the fixed lens 62.

The relay lens 75 converts the blue light beam Lb2 from parallel light into convergent light by means of the movable lens 76 and then converts the blue light beam Lb2 that becomes divergent light after the convergence into convergent light once again by means of the fixed lens 77 before it is entered to a galvano mirror 78 operating as an optical axis varying means.

Additionally, the relay lens 75 can change the state of convergence of the blue light beam Lb2 emitted from the fixed lens 77 by moving the movable lens 76 by means of the actuator 76A under the control of the control section 21 (FIG. 4) like the relay lens 60.

The galvano mirror 78 reflects the blue light beam Lb2 and makes it enter the objective lens 79. Note that the sense of circular polarization of the blue light beam Lb2 is inverted when reflected, for example, from left-circularly polarized light to right-circularly polarized light.

Additionally, the galvano mirror 78 is adapted to be able to change the angle of a reflection surface 78A so that it can adjust the proceeding direction of the blue light beam Lb2 by adjusting the angle of the reflection surface 78A under the control of the control section 21 (FIG. 4).

The objective lens 79 is integrally formed with a biaxial actuator 79A and, like the objective lens 38, can be driven in biaxial directions of the focusing direction, which is either the direction of moving the focus close to the optical disc 100 or the direction of moving the focus away from the optical disc 100, and also in the tracking direction, which is either the direction of moving the focus toward the inner peripheral side or the direction of moving the focus toward the outer peripheral side of the optical disc 100, by means of the biaxial actuator 79A.

The objective lens 79 converges the blue light beam Lb2 and emits it toward the recording light irradiation surface 100B of the optical disc 100. The objective lens has optical characteristics similar to those of the objective lens 38 and operates as a condenser lens having a numerical aperture (NA) of 0.5 for a blue light beam Lb2 due to the relationship with the relay lens 75 in terms of optical distance etc.

At this time, the blue light beam Lb2 is transmitted through the substrate 102 and focuses in the recording layer 101 as shown in FIG. 3(B). The position of the focus Fb2 of the blue light beam Lb2 is determined by the state of convergence thereof after being emitted from the fixed lens 77 of the relay lens 75. In other words, like the focus Fb1 of the blue light beam Lb1, the focus Fb2 is moved either toward the side of the guide surface 100A or toward the side of the recording light irradiation surface 100B in the recording layer 101 depending on the position of the movable lens 76.

More specifically, as in the case of the guide surface information optical system 50, the recording light irradiation surface optical system 70 is designed such that the moving distance of the movable lens 76 and the moving distance of the focus Fb2 of the blue light beam Lb2 show proportionality. For example, the focus Fb2 of the blue light beam Lb2 may be moved by 30 μm as the movable lens 76 is moved by 1 mm.

Actually, the recording light irradiation surface optical system 70 is so designed that the depth d2 of the focus Fb2 of the blue light beam Lb2 (FIG. 3(B)) in the recording layer 101 of the optical disc 100 is adjusted as a result of that the position of the movable lens 76 of the relay lens 75 is controlled by the control section 21 (FIG. 4) along with the position of the movable lens 61 of the relay lens 60.

At this time, in the optical disc apparatus 20, by the control section. 21 (FIG. 4), the focus Fb2 of the blue light beam Lb2 that is observed when the objective lens 79 is at the reference position is made to agree with the focus Fb1 of the blue light beam Lb1 that is observed when the objective lens 38 is at the reference position provided that no surface shaking takes place on the optical disc 100 (and hence the optical disc 100 is in an ideal state).

The blue light beam Lb2 becomes divergent light after being focused to the focus Fb2 and then transmitted through the recording layer 101, the reflection/transmission film 104 and the substrate 102 before it is emitted from the guide surface 101A and enters the objective lens 38.

In this way, the recording light irradiation surface optical system 70 emits a blue light beam Lb2 toward the optical disc 100 from the side of the recording light irradiation surface 100B thereof, positions the focus Fb2 of the blue light beam Lb2 in the recording layer 101 and adjusts the depth d2 of the focus Fb2 according to the position of the movable lens 76 of the relay lens 75.

(3-3-2) Reception of Blue Light Beam

Meanwhile, as described above, the blue light beam Lb1 emitted from the objective lens 38 of the guide surface information optical system 50 (FIG. 9) is converged once in the recording layer 101 of the optical disc 100 and subsequently turned to divergent light before it is made to enter the objective lens 79.

At this time, in the recording light irradiation surface optical system 70, the blue light beam Lb1 is converged to a certain extent by the objective lens 79 and then reflected by the galvano mirror 78 before it is made to enter the relay lens 75. Note that, when the blue light beam Lb1 is reflected by the reflection surface 78A, the sense of circular polarization thereof is inverted, for example, from left-circularly polarized light to right-circularly polarized light.

Subsequently, the blue light beam Lb1 is converted into parallel light by the fixed lens 62 and the movable lens 61 of the relay lens 75 and also from circularly polarized light (right-circularly polarized light) into linearly polarized light (s-polarized light) by the quarter wave plate 74 before it is reflected by the mirror 73 and made to enter the polarization beam splitter 72.

The polarization beam splitter 72 reflects the blue light beam Lb1 and makes it enter a condenser lens 80 depending on the sense of polarization of the blue light beam Lb1. The condenser lens 80 converges the blue light beam Lb1 and makes it have astigmatism by means of a cylindrical lens 81 before it emits the blue light beam Lb1 to a photodetector 82.

Meanwhile, the optical disc 100 can produce surface shaking in an actual operation. For this reason, the objective lens 38 is controlled for focus control and tracking control by means of the guide surface position control optical system 30, the drive control section 22 (FIG. 4) and the like as described above.

At this time, the focus Fb1 of the blue light beam Lb1 moves as the objective lens 38 moves so that it is displaced from the position of the focus Fb2 of the blue light beam Lb2 that is observed when the objective lens 79 is at the reference position.

For this reason, the optical positions of various optical parts of the recording light irradiation surface optical system 70 are so adjusted that the quantity of displacement of the focus Fb2 of the blue light beam Lb2 relative to the focus Fb1 of the blue light beam Lb1 in the recording layer 101 is reflected to the state of irradiation of the blue light beam Lb1 when the blue light beam Lb1 is converged by the condenser lens 80 and emitted to the photodetector 82.

Figure 11:
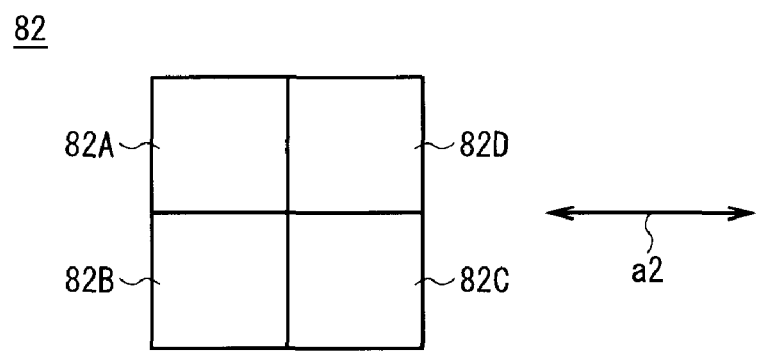
FIG. 11 is a schematic illustration showing the configuration of the detection regions of a photodetector.

As shown in FIG. 11, like the photodetector 43, the photodetector 82 has four detection regions 82A, 82B, 82C and 82D produced by dividing the surface to be irradiated with a blue light beam Lb1 so as to make it appear like a grid. Note that the direction indicated by arrow a2 (the transversal direction in FIG. 11) corresponds to the running direction of the track when the blue light beam Lb1 is emitted to the reflection/transmission film 104 (FIG. 3).

The photodetector 82 detects parts of the blue light beam Lb1 respectively by means of the detection regions 82A, 82B, 82C and 82D and generates detection signals SDAb, SDBb, SDCb and SDDb according to the detected quantities of light, which are then sent out to the signal processing section 23 (FIG. 4).

The signal processing section 23 is adapted to operate for focus control by means of a so-called astigmatism method. It computationally determines the focus error signal SFEb by means of formula (5) shown below and supplies it to the drive control section 22.

$$SFEb=(SDAb+SDCb)-(SDBb+SDDb) \quad (5)$$

The focus error signal SFEb represents the amount of the gap between the focus Fb1 of the blue light beam Lb1 and the focus Fb2 of the blue light beam Lb2 in the focusing direction.

The signal processing section 23 is also adapted to operate for tracking control by means of a so-called push-pull method. It computationally determines the tracking error signal STEb by means of formula (6) shown below and supplies it to the drive control section 22.

$$STEb=(SDAb+SDBb)-(SDCb+SDDb) \quad (6)$$

The tracking error signal STEb represents the amount of the gap between the focus Fb1 of the blue light beam Lb1 and the focus Fb2 of the blue light beam Lb2 in the tracking direction.

Additionally, the signal processing section 23 is also adapted to generate a tangential error signal necessary for tangential control. Tangential control is a control operation of moving the focus Fb2 of the blue light beam Lb2 to the target position in the tangential direction (i.e. the direction of the tangent to the track).

More specifically, the signal processing section 23 is adapted to operate for tangential control, using a push-pull signal. It computationally determines the tangential error signal SNEb by means of formula (7) shown below and supplies it to the drive control section 22.

$$SNEb=(SDAb+SDDb)-(SDBb+SDCb) \quad (7)$$

The tangential error signal SNEb represents the quantity of the gap between the focus Fb1 of the blue light beam Lb1 and the focus Fb2 of the blue light beam Lb2 in the tangential direction.

In response, the drive control section 22 controls the objective lens 79 for focus control so as to reduce the displacement of the focus Fb2 of the blue light beam Lb2 relative to the focus Fb1 of the blue light beam Lb1 in the focusing direction by generating a focus drive signal SFDb according to the focus error signal SFEb and supplying the focus drive signal SFDb to the biaxial actuator 79A.

Additionally, the drive control section 22 controls the objective lens 79 for tracking control so as to reduce the displacement of the focus Fb2 of the blue light beam Lb2 relative to the focus Fb1 of the blue light beam Lb1 in the tracking direction by generating a tracking drive signal STDb according to the tracking error signal STEb and supplying the tracking drive signal STDb to the biaxial actuator 79A.

Furthermore, the drive control section 22 operates for tangential control of adjusting the angle of the reflection surface 78A of the galvano mirror 78 so as to reduce the displacement of the focus Fb2 of the blue light beam Lb2 relative to the focus Fb1 of the blue light beam Lb1 in the tangential direction by generating a tangential drive signal SNDb according to the tangential error signal SNEb and supplying the tangential drive signal SNDb to the galvano mirror 78.

In this way, the recording light irradiation surface optical system 70 is adapted to receive the blue light beam Lb1 entering the objective lens 79 from the recording light irradiation surface 100B of the optical disc 100 and supplies the results of the reception of light to the signal processsing section 23. In response, the drive control section 22 operates to control the objective lens 79 for focus control and tracking control and also the galvano mirror 78 for tangential control so as to make the focus Fb2 of the blue light beam Lb2 agree with the focus Fb1 of the blue light beam Lb1.

(3-4) Adjustment of Optical Path Length

Meanwhile, when the optical pickup 26 of the optical disc apparatus 20 records information, the polarization beam splitter 55 (FIG. 9) divides the blue light beam Lb0 into a blue light beam Lb1 and a blue light beam Lb2 and records a recording mark RM at the target mark position in the recording layer 101 by making the blue light beam Lb1 and the blue light beam Lb2 interfere with each other in the recording layer 101 of the optical disc 100 as described above.

The laser diode 51 that emits a blue light beam Lb0 is required to make the coherence length of the blue light beam Lb0 not less than the hologram size (and hence the height RMh of the recording mark RM) in order to record the recording mark RM properly as hologram in the recording layer 101 of the optical disc 100 according to ordinary hologram forming conditions.

Actually, like ordinary laser diodes, the coherence length of the laser diode 51 substantially corresponds to the value obtained by multiplying the length of the resonator (not shown) arranged in the laser diode 51 by the refractive index of the resonator and hence may be estimated to be between about 100 µm and about 1 mm.

On the other hand, in the optical pickup 26, the blue light beam Lb1 passes through the optical path in the inside of the guide surface information optical system 50 (FIG. 9) so as to be emitted to the optical disc 100 from the side of the guide surface 100A and, at the same time, the blue light beam Lb2 passes through the optical path in the inside of the recording light irradiation surface optical system 70 (FIG. 10) and is emitted to the optical disc 100 from the side of the recording light irradiation surface 100B. In other words, since the optical path of the blue light beam Lb1 and that of the blue light beam Lb2 differ from each other in the optical pickup 26, their optical path lengths (the lengths of the optical paths from the laser diode 51 to the target mark position) show a difference.

Additionally, in the optical pickup 26, the depth of the target mark position in the recording layer 101 of the optical disc 100 is altered by adjusting the positions of the movable lenses 61 and 76 of the respective relay lenses 60 and 75 as described above. At this time, the optical pickup 26 alters the optical path length of the blue light beam Lb1 and that of the blue light beam Lb2 as a result of altering the depth of the target mark position.

However, for an interference pattern to be formed by the optical pickup 26, the difference of the optical path lengths of the blue light beams Lb1 and Lb2 needs to be not greater than the coherence length (i.e., between about 100 µm and about 1 mm) according to ordinary hologram forming conditions.

Thus, the control section 21 (FIG. 4) adjusts the optical path length of the blue light beam Lb1 by controlling the position of the movable mirror 57. In this case, the control section 21 alters the optical path length of the blue light beam Lb1 by moving the movable mirror 57 according to the position of the movable lens 61, utilizing the relationship between the position of the movable lens 61 of the relay lens 60 and the depth of the target mark position.

As a result, the optical pickup 26 can suppress the difference of the optical path lengths of the blue light beams Lb1 and Lb2 to not greater than the coherence length and hence can record a recording mark RM that is an excellent hologram at the target mark position in the recording layer 101.

In this way, the control section 21 of the optical disc apparatus 20 can suppress the difference of the optical path lengths of the blue light beams Lb1 and Lb2 in the optical pickup 26 to not greater than the coherence length by controlling the position of the movable mirror 57 and consequently record an excellent recording mark RM at the target mark position in the recording layer 101 of the optical disc 100.

(4) Recording and Reproduction of Information (4-1) Recording Information on Optical Disc When recording information on the optical disc 100, as the control section 21 of the optical disc apparatus 20 (FIG. 4) receives an information recording command, the information to be recorded and recording address information from an external apparatus (not shown), it supplies a drive command and the recording address information to the drive control section 22 and also supplies the information to be recorded to the signal processing section 23 as pointed above.

At this time, the drive control section 22 makes the guide surface position control optical system 30 (FIG. 7) of the optical pickup 26 emit a red light beam Lr1 to the optical disc 100 from the side of the guide surface 100A thereof and then makes the focus Fr of the red light beam Lr1 follow the target track that corresponds to the recording address information by controlling the objective lens 38 for focus control and tracking control (i.e., position control) according to the results of the detection of the red reflected light beam Lr2 that is the reflected light beam of the red light beam Lr1.

Additionally, the control section 21 makes the guide surface information optical system 50 (FIG. 9) emit a blue light beam Lb1 to the optical disc 100 from the side of the guide surface 100A thereof. At this time, the focus Fb1 of the blue light beam Lb1 is positioned at the rear side of the target track as the blue light beam Lb1 is converged by the objective lens 38 whose position is controlled.

Furthermore, the control section 21 adjusts the depth d1 of the focus Fb1 (FIG. 3(B)) to the target depth by adjusting the position of the movable lens 61 of the relay lens 60. As a result, the focus Fb1 of the blue light beam Lb1 is made to agree with the target mark position.

On the other hand, the control section 21 controls the shutter 71 of the recording light irradiation surface optical system 70 (FIG. 10) so as to transmit the blue light beam Lb2 and make it to be emitted to the optical disc 100 from the side of the recording light irradiation surface 100B thereof.

Additionally, the control section 21 adjusts the depth d2 of the blue light beam Lb2 (FIG. 3(B)) by adjusting the position of the movable lens 76 of the relay lens 75 according to the position of the movable lens 61 of the relay lens 60. As a result, the depth d2 of the focus Fb2 of the blue light beam Lb2 is made to agree with the depth d1 of the focus Fb1 of the blue light beam Lb1 provided that no surface shaking takes place on the optical disc 100.

Furthermore, the control section 21 makes the recording light irradiation surface optical system 70 detect the blue light beam Lb1 after it passes through the objective lenses 38 and 79 and then makes the drive control section 22 control the objective lens 79 for focus control and tracking control (i.e., position control) and the galvano mirror 78 for tangential control according to the results of the detection.

As a result, the focus Fb2 of the blue light beam Lb2 is made to agree with the position of the focus Fb1 of the blue light beam Lb1 and hence the target mark position.

Additionally, the control section 21 adjusts the position of the movable mirror 57 according to the position of the movable lens 61 of the relay lens 60 and suppresses the difference of the optical path lengths of the blue light beams Lb1 and Lb2 to not greater than the coherence length.

Thus, the control section 21 of the optical disc apparatus 20 can form an excellent recording mark RM at the target mark position in the recording layer 101 of the optical disc 100.

Meanwhile, the signal processing section 23 (FIG. 4) generates a recording signal representing a binary data showing a value of, for example, "0" or "1" according to the information to be recorded that is supplied from the external apparatus (not shown). In response, the laser diode 51 emits a blue light beam Lb0 when the value of the recording signal is "1" but does not emit any blue light beam Lb0 when the value of the recording signal is "0".

Then, as a result, a recording mark RM is formed by the optical disc apparatus 20 at the target mark position in the recording layer 101 of the optical disc 100 when the value of the recording signal is "1" but no recording mark RM is formed at the target mark position when the value of the recording signal is "0". Therefore, a value of the recording signal of "1" or "0" can be recorded at the target mark position according to the presence or absence of a recording mark RM so that consequently information to be recorded can be recorded in the recording layer 101 of the optical disc 100.

(4-2) Reproduction of Information from Optical Disc

When reproducing information from the optical disc 100, the control section 21 (FIG. 4) of the optical disc apparatus 20 makes the guide surface position control optical system 30 (FIG. 7) of the optical pickup 26 emit a red light beam Lr1 to the optical disc 100 from the side of the guide surface 100A thereof and then makes the drive control section 22 control the objective lens 38 for focus control and tracking control (i.e., position control) according to the results of the detection of the red reflected light beam Lr2 that is the reflected light beam of the red light beam Lr1.

Additionally, the control section 21 makes the guide surface information optical system 50 (FIG. 9) emit a blue light beam Lb1 to the optical disc 100 from the side of the guide surface 100A thereof. At this time, the focus Fb1 of the blue light beam Lb1 is positioned at the rear side of the target track as the blue light beam Lb1 is converged by the objective lens 38 whose position is controlled.

Note that the control section 21 is adapted to prevent a recording mark RM from being erased by error by the blue light beam Lb1 by suppressing the emission power of the laser diode 51 in a process of reproducing information.

Additionally, the control section 21 adjusts the depth d1 of the focus Fb1 (FIG. 3(B)) to the target depth by adjusting the position of the movable lens 61 of the relay lens 60. As a result, the focus Fb1 of the blue light beam Lb1 is made to agree with the target mark position.

On the other hand, the control section 21 controls the shutter 71 of the recording light irradiation surface optical system 70 (FIG. 10) so as to block the blue light beam Lb2 and prevent the blue light beam Lb2 from being emitted to the optical disc 100.

In other words, the optical pickup 26 emits only a blue light beam Lb1 to the recording mark RM recorded at the target mark position in the inside of the recording layer 101 of the optical disc 100 as reference light. In response, the recording mark RM operates as a hologram and generates a blue reproduction light beam Lb3 that is a reproduction light toward the side of the guide surface 100A. At this time, the guide surface information optical system 50 detects the blue reproduction light beam Lb3 and generates a detection signal that corresponds to the results of the detection.

Thus, the control section 21 of the optical disc apparatus 20 can detect that the recording mark RM is recorded by making a blue reproduction light beam Lb3 to be generated from the recording mark RM recorded at the target mark position in the inside of the recording layer 101 of the optical disc 100 and receiving the blue reproduction light beam Lb3.

When no recording mark RM is recorded at the target mark position, no blue reproduction light beam Lb3 is generated from the target mark position. Then, the optical disc apparatus 20 causes the guide surface information optical system 50 to generate a detection signal telling that no blue reproduction light beam Lb3 is received.

In response, the signal processing section 23 recognizes if a blue reproduction light beam Lb3 is detected or not by recognizing a value of "1" or "0" based on the detection signal and generates reproduction information according to the results of the recognition.

As a result, the optical disc apparatus 20 receives a blue reproduction light beam Lb3 when a recording mark RM is formed at the target mark position in the inside of the recording layer 101 of the optical disc 100 but it does not receive any blue reproduction light beam Lb3 when no recording mark RM is formed at the target mark position so that it can recognize the value of "1" or "0" recorded at the target mark position and consequently reproduce the information recorded in the recording layer 101 of the optical disc 100.

(5) Operation and Effect

With the above-described arrangement, when the control section 21 of the optical disc apparatus 20 records information in the optical disc 100, it makes the guide surface position control optical system 30 (FIG. 7) emit a red light beam Lr1 to the optical disc 100 from the side of the guide surface 100A thereof and then makes the focus Fr of the red light beam Lr1 follow the target track that corresponds to the recording address information by controlling the objective lens 38 for focus control and tracking control (i.e., position control) according to the results of the detection of the red reflected light beam Lr2 that is the reflected beam of the red light beam Lr1.

Then, the control section 21 makes the guide surface information optical system 50 (FIG. 9) emit a blue light beam Lb1 to the optical disc 100 from the side of the guide surface 100A thereof and, at the same time, adjusts the position of the movable lens 61 of the relay lens 60 to make the focus Fb1 of the blue light beam Lb1 agree with the target mark position.

Additionally, the control section 21 controls the shutter 71 of the recording light irradiation surface optical system 70 (FIG. 10) so as to transmit the blue light beam Lb2 and emit the blue light beam Lb2 to the optical disc 100 from the side of the recording light irradiation surface 100B thereof. At the same time, the control section 21 adjusts the position of the movable lens 76 of the relay lens 75 according to the position of the movable lens 61 of the relay lens 60.

Still additionally, the control section 21 makes the position of the focus Fb2 of the blue light beam Lb2 agree with the position of the focus Fb1 of the blue light beam Lb1, or the target mark position, by causing the recording light irradiation surface optical system 70 to detect the blue light beam Lb1 (FIG. 9) after it passes through the objective lenses 38 and 79 and then causing the drive control section 22 to control the objective lens 79 for position control (i.e., focus control and tracking control) and the galvano mirror 78 for tangential control according to the results of the detection.

As a result, the optical disc apparatus 20 can make the position of the focus Fb2 of the blue light beam Lb2 agree with the position of the focus Fb1 of the blue light beam Lb1 so as to cause the blue light beam Lb1 and the blue light beam Lb2 to interfere with each other at the target mark position in the inside of the recording layer 101 of the optical disc 100 and record the recording mark RM at the target mark position.

At this time, since the track is formed by the reflection/transmission film 104 showing a wavelength selectivity, the optical disc 100 can reflect the red light beam Lr1 with a high reflection factor and transmit the blue light beams Lb1 and Lb2 and the blue reproduction light beam Lb3 at a high transmission factor.

Accordingly, the optical disc apparatus 20 can detect the red reflected light beam Lr2 that has a sufficient quantity of light and reliably and accurately control the position of the objective lens 38, while it can also detect the blue light beam Lb1 that has a sufficient quantity of light and reliably and accurately control the position of the objective lens 79 and the operation of the galvano mirror 78. Furthermore, the optical disc apparatus 20 can emit the blue light beam Lb1 that has a sufficient quantity of light to the target mark position and reliably record a recording mark RM, and besides, it can detect the blue reproduction light beam Lb3 generated from the recording mark RM with a sufficient quantity of light so as to highly accurately reproduce the recorded information.

Thus, since the optical disc apparatus 20 properly and selectively use light beams of different wavelengths for controlling the position of the objective lens 38 and for recording a recording mark RM, it can emit blue light beams Lb1 and Lb2 with a quantity of light that is sufficient for being capable of forming an excellent information pattern to the target mark position from the opposite sides of the optical disc 100 and detect a red reflected light beam Lr2 with a quantity of light that is sufficient for reliably following the target track to achieve a high degree of compatibility.

Thus, the optical disc apparatus 20 can alter the position of the focus Fb1 of the blue light beam Lb1 and the position of the focus Fb2 of the blue light beam Lb2 (i.e., the target mark position) in the depth direction (and hence alter the distance from the reflection/recording film 104) totally independently relative to the position control of the objective lens 38 so that it can record a plurality of recording marks RM by using only different depths for them, while maintaining the position relative to the target track to a high degree of accuracy, to realize multilayer recording.

When doing so, the optical disc apparatus 20 can record recording marks RM to make them show a multilayer structure in the recording layer 101 by switching the depth of the target mark position. Thus, it is not necessary to form a plurality of recording layers (guide grooves) in the recording layer 101 in advance unlike conventional multilayer type optical discs. It is only necessary that photopolymer or the like is uniformly filled in the recording layer 101 so that the structure of the optical disc 100 can be simplified. As a result, the manufacturing process of such an optical disc 100 can be simplified if compared with the manufacturing process of a conventional multilayer optical disc.

Additionally, the optical disc apparatus 20 can adjust the position of the movable mirror 57 according to the position of the movable lens 61 of the relay lens 60 by means of the control section 21 so as to suppress the difference of the optical path lengths of the blue light beams Lb1 and Lb2 to not greater than the coherence length. Thus, it is possible to generate an excellent interference pattern that is a clear striped pattern appearing at the target mark position and thereby record an excellent recording mark RM.

With the above-described arrangement, when the optical disc apparatus 20 records information in an optical disc 100, it emits a red light beam Lr1 to the optical disc 100 from the side of the guide surface 100A thereof and makes the focus Fr thereof follow the target track by controlling the position of the objective lens 38 according to the results of the detection of the red reflected light beam Lr2 that is the reflected light beam of the red light beam Lr1. Then, the optical disc apparatus 20 emits a blue light beam Lb1 to the optical disc 100 from the side of the guide surface 100A thereof and makes the focus Fb1 thereof agree with the target mark position, while it emits a blue light beam Lb2 to the optical disc 100 from the side of the recording light irradiation surface 100B and makes the focus Fb2 thereof also agree with the target mark position by controlling the objective lens 79 and the galvano mirror 78 according to the results of the detection of the blue light beam Lb1 after it passes the objective lenses 38 and 79 so that it is possible to make the focus Fb1 of the blue light beam Lb1 and the focus Fb2 of the blue light beam Lb2 agree with each other at the target mark position and make the blue light beam Lb1 and the blue light beam Lb2 interfere with each other. Thus, it is possible to record a recording mark RM at the target mark position.

(6) Other Embodiments

While a focus error signal, a tracking error signal and a tangential error signal are generated according to the results of the detection of the blue light beam Lb1 so as to control the objective lens 79 for focus control and tracking control and also the galvano mirror 78 for tangential control in the above-described embodiment, the present invention is by no means limited thereto and, for example, it may alternatively be so arranged that a focus error signal, a tracking error signal and a tangential error signal are generated according to the results of the detection of the blue light beam Lb2 by the photodetector 64 so as to control the objective lens 79 for focus control and tracking control and also the galvano mirror 78 for tangential control by means of the guide surface information optical system 50.

While the optical path length of the blue light beam Lb1 is adjusted by means of the polarization beam splitter 55, the quarter wave plate 56 and the movable mirror 57 in the above-described embodiment, the present invention is by no means limited thereto and it may alternatively be so arranged that the optical path length of the blue light beam Lb1 is adjusted by combining various optical parts. For example, the optical path length of the blue light beam Lb1 may be adjusted by combining a plurality of mirrors or by causing the blue light beam Lb1 to pass through mediums showing different refractive indexes. Still alternatively, it may be so arranged that the optical path length of the blue light beam Lb2 is adjusted instead of the optical path length of the blue light beam Lb1. What is essential is to make the optical path length of the blue light beam Lb1 and the optical path length of the blue light beam Lb2 substantially equal to each other.

While the depth of the target mark position in the optical disc 100 (and hence the distance from the reflection/transmission film 104) is adjusted by means of the relay lenses 60 and 75 in the above-described embodiment, the present invention is by no means limited thereto and the depth of the target mark position may alternatively be altered by some other technique. For example, the depth of the target mark position may be altered by moving a single condenser lens or by controlling the objective lenses 38 and 70 for focus control.

While the optical axis of the red light beam Lr1 and the optical axis of the blue light beam Lb1 are made to agree with each other in the above-described embodiment, the present invention is by no means limited thereto and the optical axis of the red light beam Lr1 and the optical axis of the blue light beam Lb1 may be inclined by a predetermined angle relative to each other so that the target track and the target mark position are intentionally made to disagree with each other (in other words, an offset is provided) as viewed from the guide surface 100A or the recording light irradiation surface 100B of the optical disc 100.

While a focus error signal is generated by means of an astigmatism method in the guide surface position control optical system 30 (FIG. 7) in the above-described embodiment, the present invention is by no means limited thereto and a focus error signal may alternatively be generated by some other technique such as a knife edge method or a Foucault method. A focus error signal may also be generated in the recording light irradiation surface optical system 70 by some other technique.

The method by which the guide surface position control optical system 30 generates a tracking error signal is not limited to the above-described push-pull method and some other method such as a 3-beam method or a differential push-pull method may alternatively be used to generate a tracking error signal.

On the other hand, any other method that does not utilize guide grooves and pits may alternatively be used for the recording light irradiation surface optical system 70 to generate a tracking error signal and a tangential error signal because neither guide grooves nor pits are formed in the recording layer 101 where the focuses Fb1 and Fb2 of the blue light beams Lb1 and Lb2 are positioned.

In the above instances, it is sufficient that optical elements such as diffraction gratings are provided to replace the cylindrical lenses 42 and 81 depending on the method of generating error signals. Additionally, it is sufficient for the photodetectors 43 and 82 that they have detection regions formed by means of a dividing pattern that matches the method of generating error signals. Furthermore, it is sufficient for the signal processing section 23 that it generates error signals by means of an arithmetic process that matches the method of generating error signals.

While the red light beam Lr1 is transmitted and the red reflected light beam Lr2 is reflected by the non-polarizing beam splitter 34 of the guide surface position control optical system 30 in the above-described embodiment, the present invention is by no means limited thereto and it may alternatively be so arranged that a half wave plate and a quarter wave plate are combined to appropriately alter the direction of polarization of light beam and the red light beam Lr1 is transmitted while the red reflected light beam Lr2 is reflected by means of a polarization beam splitter.

While the reflection/transmission film 104 is arranged between the recording layer 101 and the substrate 102 of the optical disc 100 in the above-described arrangement, the present invention is by no means limited thereto and the reflection/transmission film 104 may alternatively be arranged at some other position such as a position between the recording layer 101 and the substrate 103, a position in the inside of the substrate 102 or a position in the inside of the recording layer 101.

While a red light beam having a wavelength of about 660 nm (to be referred to as position control light beam hereinafter) is employed for controlling the position of the objective lens 38 and a blue light beam having a wavelength of about 405 nm (to be referred to recording light beam hereinafter) is employed for forming a recording mark RM in the above-described embodiment, the present invention is by no means limited thereto and any other wavelengths may appropriately be used for the position control light beam and the recording light beam.

In such an instance, it is sufficient for the reflection/transmission film 104 to reflect by nature the position control light beam of the selected wavelength and transmits the recording light beam of the selected wavelength. Additionally, it is sufficient that the recording layer 101 is made of a material that reacts to the recording light beam of the selected wavelength.

When the wavelength of the recording light beam is altered, the size of recording mark RM changes as indicated by the above-described formulas (1) and (2). Therefore, it is desirable to appropriately alter the distance p1 between recording marks RM, the distance p2 between tracks and the distance p3 between mark recording layers accordingly.

While a recording mark RM representing the value of information of "0" or "1" is recorded by newly forming a very small hologram in the recording layer 101 of the optical disc 100 for a so-called positive type recording operation in the above-described embodiment, the present invention is by no means limited thereto and it may alternatively be so arranged that holograms are formed in advance to show a multilayer structure at a predetermined interval in the inside of the recording layer 101 of the optical disc 100 and over the entire the optical disc 100 and the value of information of "0" or "1" is recorded by focusing blue light beams Lb1 and Lb2 of a predetermined intensity to the target mark position and destructing (erasing) the hologram of the target mark position for a so-called negative type recording operation.

While the reflection/transmission film 104 is made to show a wavelength selectivity so as to reflect a position control light beam of a wavelength of about 660 nm and transmits a recording light beam of a wavelength of about 405 nm in the above-described embodiment, the present invention is by no means limited thereto and it may alternatively be so arranged that the reflection/transmission film 104 shows a polarization selectivity so as to make the direction of polarization of the position control light beam and the direction of polarization of the recording light beam different from each other in order to reflect the position control light beam and transmit the recording light beam.

While the diameter of the optical disc 100 is about 120 mm, the thickness t1 of the recording layer 101 is about 0.3 mm and both of the thicknesses t2 and t3 of the substrates 102 and 103 are about 0.6 mm in the above-described embodiment, the present invention is by no means limited thereto and they may alternatively have values different from those listed above. It is sufficient that the optical characteristics and the positions of the optical parts are selected so as to make the focuses of the blue light beams Lb1 and Lb2 agree with the target mark position, taking the thicknesses of the recording layer 101 and the substrates 102 and 103 and the refractive indexes of the materials of these components into consideration.

While the optical disc apparatus 20 includes the drive control section 22, the signal processing section 23, the actuator 38A, the photodetector 82, the actuator 79A and the galvano mirror 78, of which the drive control section 22, the signal processing section 23 and the actuator 38A operate as a first control means and the photodetector 82 operates as a detection means, while the drive control section 22, the signal processing section 23, the actuator 79A and the galvano mirror 78 operate as a second control means, in the above-described embodiment, the present invention is by no means limited thereto and other circuits may be employed to operate as a first control means, a detection means and a second control means for the optical disc apparatus.

INDUSTRIAL APPLICABILITY

The present invention can find applications in optical disc apparatus for recording music contents, video contents or various data by a large amount on an optical disc, which is a recording medium.

The invention claimed is:

1. An optical disc apparatus for irradiating a disk-shaped recording medium with first and second light beams emitted from a same light source so as to be focused to a same focus position from opposite surfaces of the disk-shaped recording medium respectively by way of corresponding first and second objective lenses to record a standing wave, comprising:
  a first controller that controls a position of the first objective lens according to a returning light beam from a reflection layer arranged in the recording medium;
  a detector that detects the first or second light beam emitted from either the first objective lens or the second objective lens, transmitted through the recording medium, and made to enter an other of the first objective lens or second objective lens; and
  a second controller that controls a position of the second objective lens so as to make a focus position of the first objective lens and a focus position of the second objective lens agree with each other according to an outcome of detection by the detector.

2. The optical disc apparatus according to claim 1, further comprising
  a second light source that irradiates the recording medium with a third light beam by way of the first objective lens, making an optical axis thereof agree with an optical axis of the first light beam, wherein
  the first controller controls the position of the first objective lens according to the returning light beam produced as the third light beam is reflected from the reflection layer.

3. The optical disc apparatus according to claim 1, wherein the third light beam has a wavelength which is different from a wavelength of the first or second light beams, and
  the reflection layer transmits the first and second light beams and reflects the third light beam due to its wavelength selectivity.

4. The optical disc apparatus according to claim 1, wherein a track showing a recording position of the standing wave is formed in the reflection layer, and
  the first controller controls the position of the first objective lens upon recognizing the track on the basis of the returning light beam.

5. The optical disc apparatus according to claim 1, further comprising
  an optical axis varying device that varies a direction of an optical axis of the second light beam, wherein
  the second controller controls the direction of the optical axis of the second light beam by the optical axis varying device so as to make the focus positions of the first and second objective lenses agree with each other.

6. The optical disc apparatus according to claim 1, further comprising a focus position moving device that moves the focus positions of the first and second light beams in the direction of the optical axes of the first and second light beams by altering a state of convergence of the first light beam and that of the second light beam.

7. The optical disc apparatus according to claim 1, further comprising:
  an optical path length altering device that alters at least either a first optical path length from the light source to the focus position of the first light beam or a second optical path length from the light source to the focus position of the second light beam; and
  an optical path length control device that controls the optical path length altering device so as to make the first optical path length and the second optical path length substantially agree with each other.

8. The optical disc apparatus according to claim 7, wherein the optical path length altering device makes the first light beam that is a linearly polarized light beam emitted from a polarization beam splitter substantially perpendicularly enter a movable mirror through a quarter wave plate and subsequently makes the reflected light beam thereof enter the polarization beam splitter by way of the quarter wave plate, and
  the optical path length control device controls the position of the movable mirror in the direction of the optical axis of the first light beam so as to make the first optical path length and the second optical path length substantially equal to each other.

9. The optical disc apparatus according to claim 1, wherein the first controller controls the position of the first objective lens according to the returning light beam that has passed through the first objective lens.

10. A focus position control method for irradiating a target of irradiation with first and second light beams so as to be focused to a same focus position from opposite surfaces of the target of irradiation by way of first and second objective lenses, comprising:
  controlling a position of the first objective lens according to a returning light beam from a reflection layer arranged in the target of irradiation;
  detecting the first or second light beam emitted from the first or second objective lens, transmitted through the target of irradiation and made incident to an other of the first objective lens or second objective lens; and
  controlling a position of the second objective lens so as to make focus positions of the first and second objective lenses agree with each other according to the outcome of detection.

11. A recording medium comprising:
  a recording layer; and
  a reflection layer that reflects a first type light entering a first surface of the recording medium and that enables a second type light entering the first surface or a second surface of the recording medium to pass through the reflection layer, the first and second surfaces of the recording medium being opposite surfaces,
  wherein the recording layer records a standing wave generated by first and second light beams of the second type emitted from opposite surfaces thereof by way of first and second objective lenses and the reflection layer, and
  wherein the reflection layer produces
    a reflected light beam for controlling the first objective lens by reflecting a light beam of the first type emitted to the reflection layer by way of first surface and from the first objective lens, and
    a transmitted light beam for controlling the second objective lens by transmitting first or second light beam of the second type through the reflection layer.

12. The recording medium according to claim 11, wherein the recording medium is disk shaped, and
  a track showing the recording position at a time when the standing wave due to the first and second light beams is recorded is formed in the reflection layer.

13. The recording medium according to claim 12, wherein the track is formed in the reflection layer by spirally or concentrically arranging guide grooves.

14. The recording medium according to claim 12, wherein the track is formed in the reflection layer by spirally or concentrically arranging pits.

* * * * *